US012567269B2

(12) United States Patent
Lee et al.

(10) Patent No.: US 12,567,269 B2
(45) Date of Patent: Mar. 3, 2026

(54) METHOD OF TRAINING IMAGE CAPTIONING MODEL AND COMPUTER-READABLE RECORDING MEDIUM

(71) Applicants: HYUNDAI MOTOR COMPANY, Seoul (KR); KIA CORPORATION, Seoul (KR); Seoul National University R&DB Foundation, Seoul (KR)

(72) Inventors: Hyungseok Lee, Seoul (KR); Hyun Sung Park, Yongin-si (KR); Gunhee Kim, Seoul (KR); Hoeseong Kim, Seoul (KR); Jongseok Kim, Seoul (KR)

(73) Assignees: Hyundai Motor Company, Seoul (KR); Kia Corporation, Seoul (KR); Seoul National University R&DB Foundation, Seoul (KR)

( * ) Notice: Subject to any disclaimer, the term of this patent is extended or adjusted under 35 U.S.C. 154(b) by 287 days.

(21) Appl. No.: 18/204,537

(22) Filed: Jun. 1, 2023

(65) Prior Publication Data
US 2024/0046673 A1 Feb. 8, 2024

(30) Foreign Application Priority Data
Aug. 3, 2022 (KR) ........................ 10-2022-0096963

(51) Int. Cl.
*G06V 20/70* (2022.01)
*G06V 10/74* (2022.01)
(Continued)

(52) U.S. Cl.
CPC ............ *G06V 20/70* (2022.01); *G06V 10/761* (2022.01); *G06V 10/7715* (2022.01); *G06V 10/80* (2022.01); *G06V 10/82* (2022.01)

(58) Field of Classification Search
CPC .. G06V 20/70; G06V 10/7715; G06V 10/761; G06V 10/82; G06V 10/80
See application file for complete search history.

(56) References Cited

U.S. PATENT DOCUMENTS 9,679,221 B2 6/2017 Mase
10,534,960 B2 1/2020 Perona et al.
(Continued)

FOREIGN PATENT DOCUMENTS

WO 2020190112 A 9/2020

OTHER PUBLICATIONS

Kim et al., 2021, "Viewpoint-Agnostic Change Captioning with Cycle Consistency" (pp. 2075-2084). (Year: 2021).*
(Continued)

*Primary Examiner* — Manav Seth
(74) *Attorney, Agent, or Firm* — Morgan, Lewis & Bockius LLP

(57) ABSTRACT

A method of training an image captioning model includes: extracting a feature of a first image from the first image and extracting a feature of a second image from the second image; by encoding viewpoint information based on the feature of the first image and the feature of the second image, obtaining a first image's feature including viewpoint information and a second image's feature including the viewpoint information; obtaining a first image's viewpoint-aligned feature and a second image's viewpoint-aligned feature, based on the first image's feature including the viewpoint information and the second image's feature including the
(Continued)

100 viewpoint information; and generating a caption describing a difference between the first image and the second image, based on the first image's viewpoint-aligned feature and the second image's viewpoint-aligned feature.

36 Claims, 16 Drawing Sheets

(51) Int. Cl.
　　*G06V 10/77* 　　　(2022.01)
　　*G06V 10/80* 　　　(2022.01)
　　*G06V 10/82* 　　　(2022.01)

(56) 　　　　　References Cited

U.S. PATENT DOCUMENTS

| | | | |
|---|---|---|---|
| 10,726,059 | B1 * | 7/2020 | Ren .......................... G06V 10/811 |
| 11,412,023 | B2 * | 8/2022 | Wang ..................... G06F 18/2413 |
| 12,167,100 | B2 * | 12/2024 | Lin ............................ G06N 3/044 |
| 2007/0030356 | A1 * | 2/2007 | Yea .......................... H04N 19/105 |
| | | | 348/222.1 |
| 2013/0002812 | A1 * | 1/2013 | Bhat ...................... H04N 13/194 |
| | | | 348/43 |
| 2013/0088570 | A1 | 4/2013 | Takahashi et al. |
| 2015/0161094 | A1 * | 6/2015 | Oh ......................... G06F 16/5838 |
| | | | 715/231 |
| 2019/0138813 | A1 | 5/2019 | Pereira et al. |
| 2020/0242154 | A1 * | 7/2020 | Haneda ................. G06F 16/535 |
| 2021/0232850 | A1 | 7/2021 | Bui et al. |
| 2022/0058390 | A1 * | 2/2022 | Tran ......................... G06V 10/82 |
| 2023/0153522 | A1 * | 5/2023 | Cho ......................... G06F 18/214 |
| | | | 382/159 |

OTHER PUBLICATIONS

H. Kim et al. "Viewpoint-Agnostic Change Captioning with Cycle Consistency," 2021 IEEE/CVF International Conference on Computer Vision (ICCV), Montreal, QC, Canada, 2021, pp. 2075-2084, doi: 10.1109/ICCV48922.2021.00210.

Park et al. "Robust Change Captioning," 2019 IEEE/CVF International Conference on Computer Vision (ICCV), Seoul, Korea (South), 2019, pp. 4623-4632, doi: 10.1109/ICCV.2019.00472.

Shi et al. "Finding it at another side: A viewpoint-adapted matching encoder for change captioning" Sep. 30, 2020 https://doi.org/10.48550/arXiv.2009.14352.

Kim et al. "Dual compositional learning in interactive image retrieval" Dual Compositional Learning in Interactive Image Retrieval. Proceedings of the AAAI Conference on Artificial Intelligence, 35(2), 1771-1779. https://doi.org/10.1609/aaai.v3512.16271 May 18, 2021.

* cited by examiner

FIG. 20

| Model | CIDEr | BLEU-4 | METEOR | SPICE |
|---|---|---|---|---|
| COMPARATIVE EXAMPLE 1 | 56.7 | 40.3 | 27.1 | 16.1 |
| COMPARATIVE EXAMPLE 2 | 60.1 | 40.9 | 27.1 | 15.8 |
| EMBODIMENT 1 | 70.0 | 44.5 | 29.2 | 17.1 |

FIG. 21

| Model | CIDEr | BLEU-4 | METEOR | SPICE |
|---|---|---|---|---|
| COMPARATIVE EXAMPLE 3 | 62.0 | 41.7 | 27.5 | 16.4 |
| COMPARATIVE EXAMPLE 4 | 60.6 | 41.0 | 27.2 | 15.7 |
| EMBODIMENT 2 | 71.7 | 45.0 | 29.3 | 17.6 |

FIG. 22
Correct Answer Rate
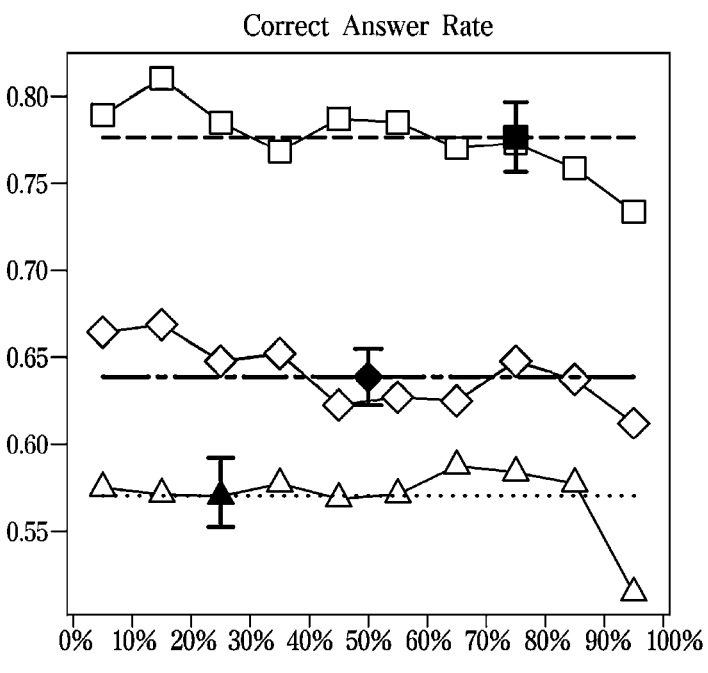
CIDEr
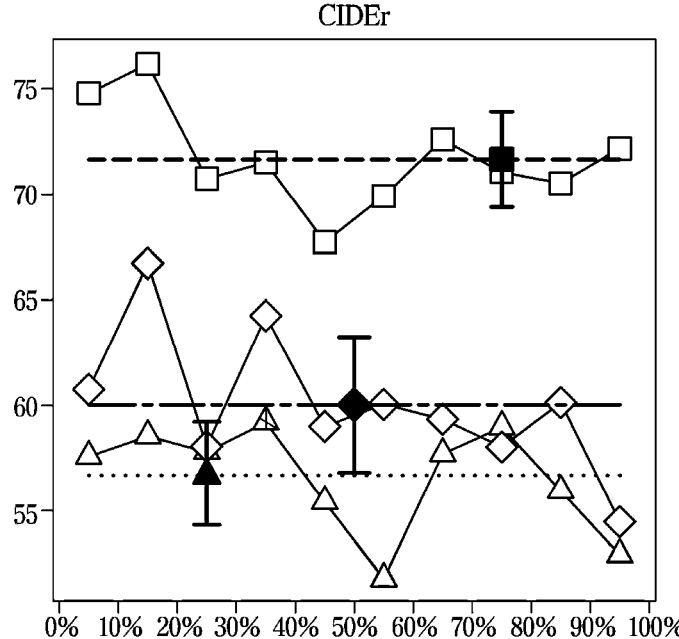

FIG. 23

Before                                           After

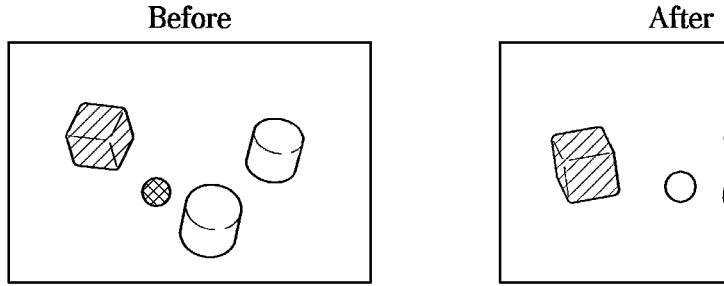

COMPARATIVE : OBJECT IN FRONT OF THE LARGE CYAN THING AND
EXAMPLE 1          LEFT OF THE BIG CYAN CYLINDER IN THE PERSPECTIVE
                   OF THE BEFORE IMAGE CHANGED ITS LOCATION

COMPARATIVE : SMALL YELLOW SPHERE CHANGED TO YELLOW
EXAMPLE 2

EMBODIMENT 2 : SMALL RED SHINY OBJECT CHANGED TO GREEN

FIG. 24

Before                                           After

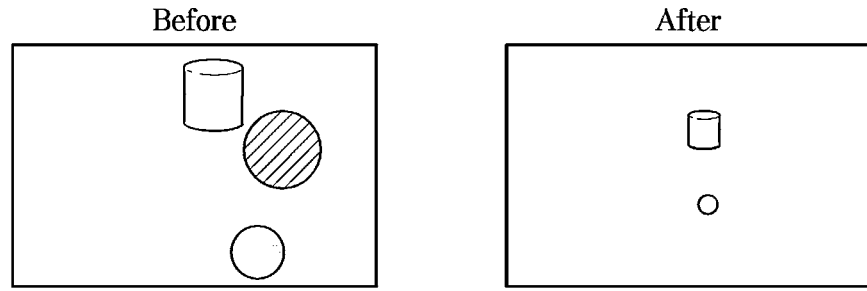

COMPARATIVE : LARGE CYLINDER BECAME CYAN
EXAMPLE 1

COMPARATIVE : OTHER BROWN RUBBER OBJECT THAT IS THE
EXAMPLE 2          SAME SIZE AS THE GREEN RUBBER CYLINDER IS MISSING

EMBODIMENT 2 : YELLOW SPHERE IS MISSING

FIG. 25
Before                          After
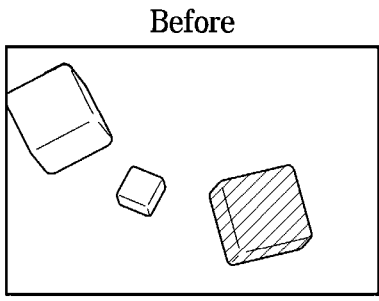    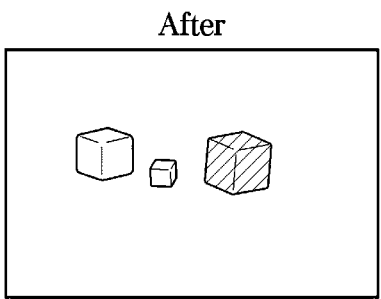
COMPARATIVE    : OBJECT THAT IS IN FRONT OF THE MATTE BLOCK
  EXAMPLE 1      AND LEFT OF THE SMALL GRAY OBJECT IN THE
                 PERSPECTIVE OF THE BEFORE IMAGE BECAME GRAY
COMPARATIVE    : LARGE CUBE IN FRONT OF
  EXAMPLE 2      THE GRAY OBJECT IN THE PERSPECTIVE OF
                 THE BEFORE IMAGE CHANGED ITS LOCATION
EMBODIMENT 2   : TWO SCENES SEEM IDENTICAL

METHOD OF TRAINING IMAGE CAPTIONING MODEL AND COMPUTER-READABLE RECORDING MEDIUM

CROSS-REFERENCE TO RELATED APPLICATION

The present application claims priority to Korean Patent Application No. 10-2022-0096963, filed on Aug. 3, 2022, the entire contents of which is incorporated herein for all purposes by this reference.

BACKGROUND OF THE PRESENT DISCLOSURE

Field of the Present Disclosure

The present disclosure relates to image captioning that generates a sentence about an image, and more specifically, to a method of training an image captioning model and a computer-readable recording medium storing a program for implementing an image captioning method.

Description of Related Art

Image captioning technology is capable of textually describing information related to an input image. By storing an image and a description related thereto together, search performance may also be improved. Furthermore, when a person who is visually impaired photographs an image, a description on the captured image may be output, and thus the person may be provided with information related to where the person is at.

Alternatively, image captioning technology may be used in security and monitoring fields, by applying image captioning technology to images captured by closed-circuit television (CCTV), and furthermore to the above, image captioning technology may be used in various fields.

As a specific example of image captioning technology, when two images are input, a sentence describing a difference between the two images may be generated. By use of the technical feature, a change in images photographed at different points in time may be identified, and the identification result may be used for various purposes.

However, when a viewpoint change between two images occurs due to a change in position or angle of camera, inaccurate captioning results may be output such as an erroneous determination that a change has occurred despite no actual change.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of training an image captioning model robust to a viewpoint change between two images and a computer-readable recording medium storing a program for implementing an image captioning method.

Additional aspects of the present disclosure will be set forth in part in the description which follows, and in part, will be obvious from the description, or may be learned by practice of the present disclosure.

According to an aspect of the present disclosure, there is provided a method of training an image captioning model, the method including: extracting a feature of a first image from the first image and extracting a feature of a second image from the second image; by encoding viewpoint information based on the feature of the first image and the feature of the second image, obtaining a first image's feature including viewpoint information and a second image's feature including the viewpoint information; obtaining a viewpoint-aligned feature of the first image and a viewpoint-aligned feature of the second image, based on the first image's feature including the viewpoint information and the second image's feature including the viewpoint information; and generating a caption describing a difference between the first image and the second image, based on the viewpoint-aligned feature of the first image and the viewpoint-aligned feature of the second image.

The first image's feature including the viewpoint information may indicate a first image's feature infused with the viewpoint information of the second image, and the second image's feature including the viewpoint information may indicate a second image's feature infused with the viewpoint information of the first image.

The obtaining of the first image's feature including the viewpoint information and the second image's feature including the viewpoint information may include: generating a similarity map based on the feature of the first image and the feature of the second image, and encoding the viewpoint information by comparing locations of an object existing in both the first image and the second image based on the similarity map.

The obtaining of the viewpoint-aligned feature of the first image and the viewpoint-aligned feature of the second image may include obtaining fused features by fusing the first image's feature including the viewpoint information and the second image's feature including the viewpoint information.

The obtaining of the viewpoint-aligned feature of the first image and the viewpoint-aligned feature of the second image may further include obtaining a difference feature indicating the difference between the first image and the second image by determining a difference among the obtained fused features.

The obtaining of the viewpoint-aligned feature of the first image and the viewpoint-aligned feature of the second image may further include obtaining the viewpoint-aligned feature of the first image and the viewpoint-aligned feature of the second image by applying an attention mechanism to the fused features and the difference feature.

The generating of the caption may include obtaining fused features by fusing the viewpoint-aligned feature of the first image and the viewpoint-aligned feature of the second image.

The generating of the caption may further include obtaining a difference feature indicating the difference between the first image and the second image by determining a difference among the obtained fused features.

The generating of the caption may include obtaining a final feature of the first image and the second image, based on the viewpoint-aligned feature of the first image, the viewpoint-aligned feature of the second image, and the difference feature.

The generating of the caption may include inputting the obtained final feature to a recurrent neural network (RNN) to convert into text.

The method may further include obtaining a composite image feature by applying the caption to the viewpoint-aligned feature of the first image.

The method may further include determining a first loss value based on the generated caption and a target caption, determining a second loss value based on the composite image feature and the viewpoint-aligned feature of the second image, and determining a final loss value based on the first loss value and the second loss value.

The method may further include adjusting a parameter of the image captioning model in a direction to minimize the final loss value.

According to an aspect of the present disclosure, there is provided a computer-readable recording medium storing a program for implementing an image captioning method using an image captioning model, the image captioning method including: extracting a feature of a first image from the first image and extracting a feature of a second image from the second image; by encoding viewpoint information based on the feature of the first image and the feature of the second image, obtaining a first image's feature including viewpoint information and a second image's feature including the viewpoint information; obtaining a viewpoint-aligned feature of the first image and a viewpoint-aligned feature of the second image, based on the first image's feature including the viewpoint information and the second image's feature including the viewpoint information; and generating a caption describing a difference between the first image and the second image, based on the viewpoint-aligned feature of the first image and the viewpoint-aligned feature of the second image.

The first image's feature including the viewpoint information may indicate a first image's feature infused with the viewpoint information of the second image, and the second image's feature including the viewpoint information may indicate a second image's feature infused with the viewpoint information of the first image.

The obtaining of the first image's feature including the viewpoint information and the second image's feature including the viewpoint information may include: generating a similarity map based on the feature of the first image and the feature of the second image, and encoding the viewpoint information by comparing locations of an object existing in both the first image and the second image based on the similarity map.

The obtaining of the viewpoint-aligned feature of the first image and the viewpoint-aligned feature of the second image may include obtaining fused features by fusing the first image's feature including the viewpoint information and the second image's feature including the viewpoint information.

The obtaining of the viewpoint-aligned feature of the first image and the viewpoint-aligned feature of the second image may further include obtaining a difference feature indicating the difference between the first image and the second image by determining a difference among the obtained fused features.

The obtaining of the viewpoint-aligned feature of the first image and the viewpoint-aligned feature of the second image may further include obtaining the viewpoint-aligned feature of the first image and the viewpoint-aligned feature of the second image by applying an attention mechanism to the fused features and the difference feature.

The generating of the caption may include obtaining fused features by fusing the viewpoint-aligned feature of the first image and the viewpoint-aligned feature of the second image.

The generating of the caption may further include obtaining a difference feature indicating the difference between the first image and the second image by determining a difference among the obtained fused features.

The generating of the caption may include obtaining a final feature of the first image and the second image, based on the viewpoint-aligned feature of the first image, the viewpoint-aligned feature of the second image, and the difference feature.

The generating of the caption may include inputting the obtained final feature to a recurrent neural network (RNN) to convert into text.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 20 and FIG. 21 are tables showing experiment results for evaluating a performance of an image captioning model trained according to an exemplary embodiment of the present disclosure;

FIG. 22 is a graph showing an experiment result for evaluating a performance of an image captioning model trained according to an exemplary embodiment of the present disclosure; and FIG. 23, FIG. 24 and FIG. 25 are diagrams showing image captioning results obtained by an image captioning model trained according to an exemplary embodiment of the present disclosure.

Figure 1:
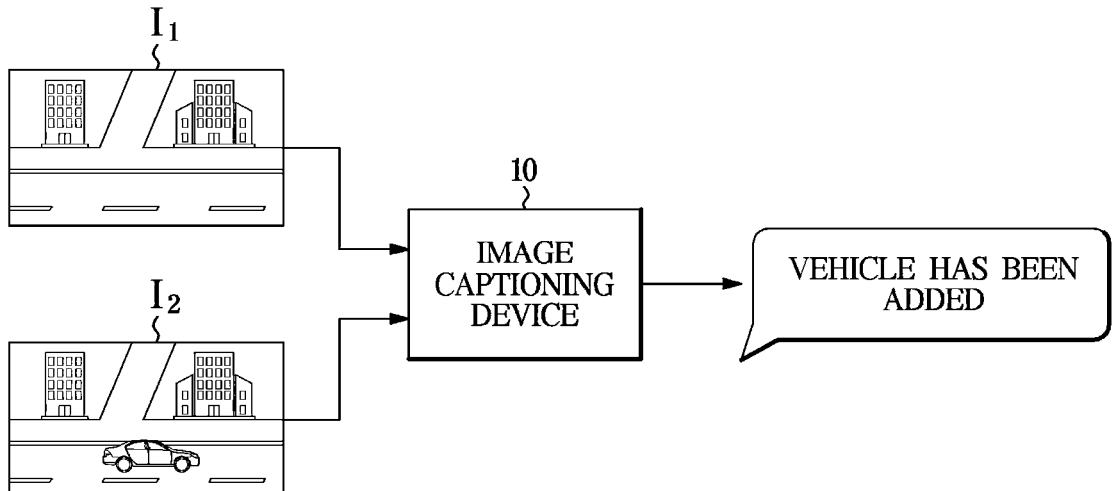
FIG. 1 is a diagram illustrating a function of an image captioning device.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The exemplary embodiments set forth herein and illustrated in the configuration of the present disclosure are only exemplary embodiments of the present disclosure, so it should be understood that they may be replaced with various equivalents and modifications at the time of the present disclosure.

Terminologies used herein are for describing various exemplary embodiments only and is not intended to limit the present disclosure. It is to be understood that the singular forms are intended to include the plural forms as well, unless the context clearly dictates otherwise.

It will be further understood that the terms "include", "comprise" and/or "have" when used in the present specification, specify the presence of stated features, integers, steps, operations, elements, and/or components, but do not preclude the presence or addition of one or more other features, integers, steps, operations, elements, components, and/or groups thereof.

The terms such as "~part", "~device", "~block", "~member", "~module", and the like may refer to a unit of processing at least one function or act. For example, the terms may refer to at least process processed by at least one hardware, such as field-programmable gate array (FPGA)/ application specific integrated circuit (ASIC), software stored in memories or processors.

It will be understood that, although the terms first, second, etc. may be used herein to describe various elements, these elements should not be limited by these terms.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it should be understood that the term "at least one of a, b, or c" may include only a, only b, only c, both a and b, both a and c, both b and c, or all of a, b and c.

Hereinafter, various embodiments of the present disclosure are described in detail with reference to the accompanying drawings.

FIG. 1 is a diagram illustrating a function of an image captioning device.

Referring to FIG. 1, two images may be input to an image captioning device 10, and the image captioning device 10 may be configured to generate and output a sentence describing a difference between the two images.

For example, the two images may be images capturing a same scene at different points in time. When a difference between input images exists, the image captioning device 10 may be configured to generate a sentence describing the difference, and when a difference is non-existent, generate a sentence describing that no difference exists.

In the example of FIG. 1, a first image $I_1$ and a second image $I_2$ capturing the same scene at different points in time are input to the image captioning device 10.

When the first image $I_1$ is a before image photographed earlier than the second image $I_2$, and the second image $I_2$ is an after image, the image captioning device 10 may be configured to determine that a vehicle is added to the second image $I_2$ by comparing the two images $I_1$ and $I_2$, generate and output a sentence describing that the vehicle has been added.

Figure 2:
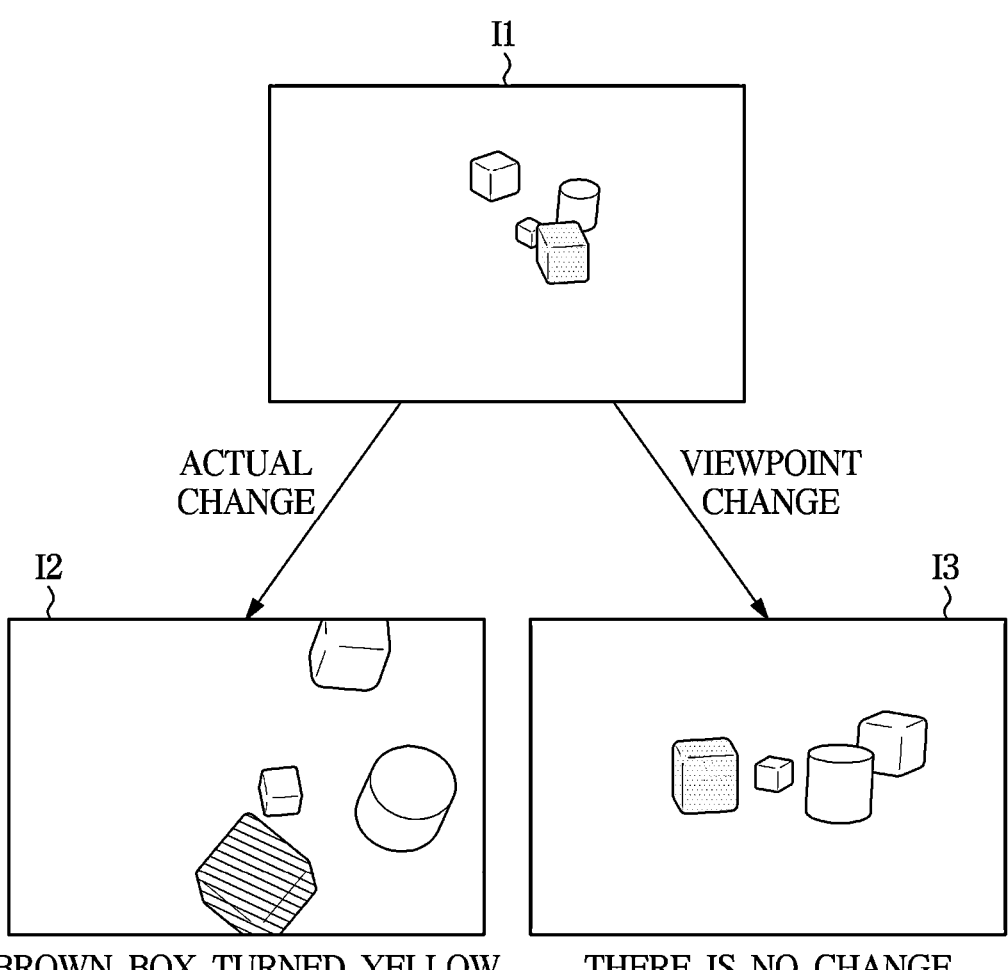
FIG. 2 is a diagram illustrating types of difference which may be shown in a before image.

FIG. 2 is a diagram illustrating types of difference which may be shown in a before image.

Referring to FIG. 2, assumed are a first image $I_1$ obtained by capturing a specific scene, and a second image $I_2$ and a third image $I_3$ obtained by capturing a same scene after the first image $I_1$ is captured.

By comparing the first image $I_1$ with both the second image $I_2$ and the third image $I_3$, it may be confirmed that a viewpoint is changed. In the third image $I_3$, however, other than the viewpoint change, there is no actual change in an object present in the corresponding scene and in position of object. On the other hand, a brown box turned yellow in the second image $I_2$.

When the image captioning device 10 accurately identifies a difference between the first image $I_1$ and the second image $I_2$, the image captioning device 10 is required to generate a sentence describing that the brown box turned yellow.

Furthermore, when the image captioning device 10 accurately identifies a difference between the first image $I_1$ and the third image $I_3$, the image captioning device 10 is required to generate a sentence describing that no change exists.

However, when the image captioning device 10 is incapable of accurately identifying an actual difference between two images due to a viewpoint change of the two images, the image captioning device 10 may incorrectly determine a change between the image $I_1$ and the second image $I_2$, or erroneously generate a sentence describing that a change has occurred, even though no change occurs between the first image $I_1$ and the third image $I_3$.

An apparatus of training an image captioning model (hereinafter, 'training apparatus') according to various exemplary embodiments of the present disclosure may be configured to generate an image captioning model robust to a viewpoint change, i.e., an image captioning model configured for accurately identifying an actual change in addition to a viewpoint difference, despite the viewpoint difference in two images. Here, the viewpoint difference between two images may be caused by a change in location or angle of a camera that captures images.

Hereinafter, operations of the training apparatus and a method of training an image captioning model (hereinafter, 'training method') are described in detail.

Figure 3:
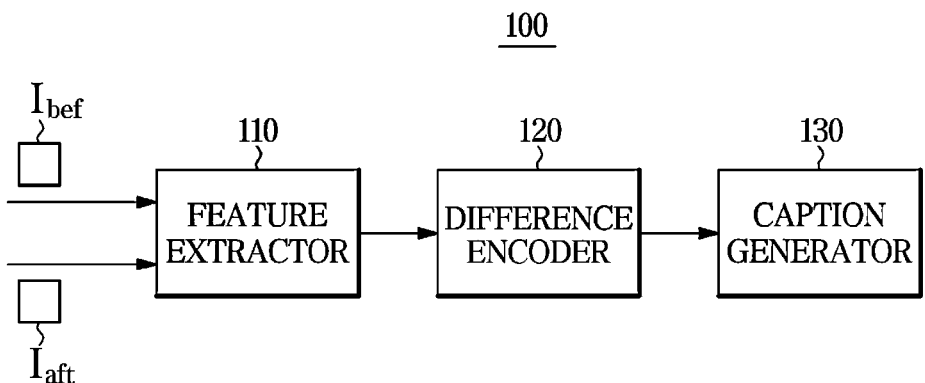
FIG. 3 is a block diagram illustrating operations of an apparatus of training an image captioning model according to an exemplary embodiment of the present disclosure.
Figure 4:
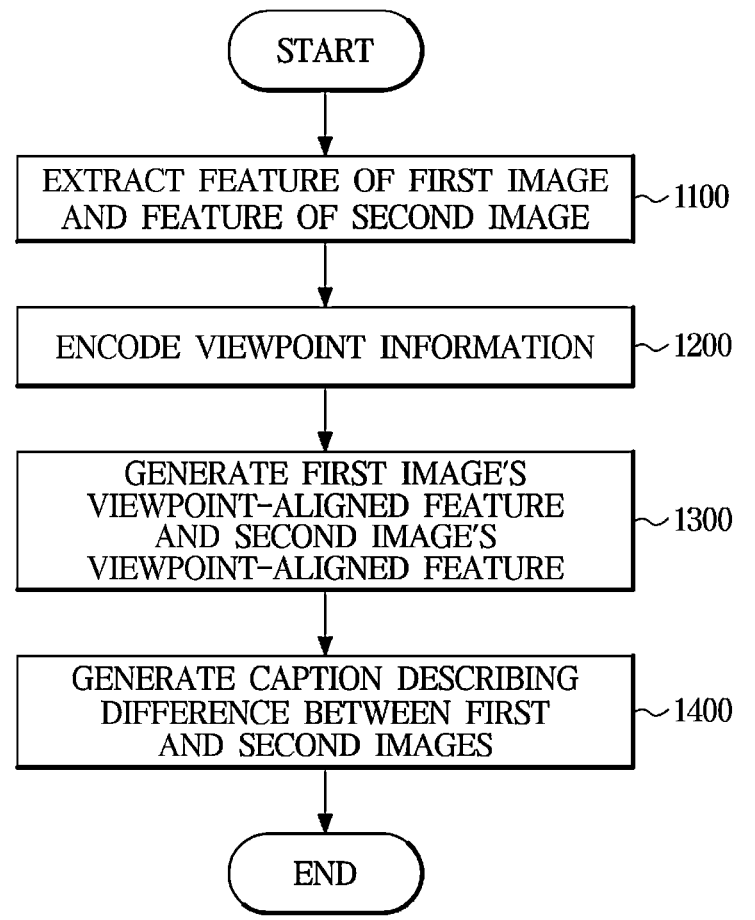
FIG. 4 is a flowchart illustrating a method of training an image captioning model according to an exemplary embodiment of the present disclosure.
Figure 5:
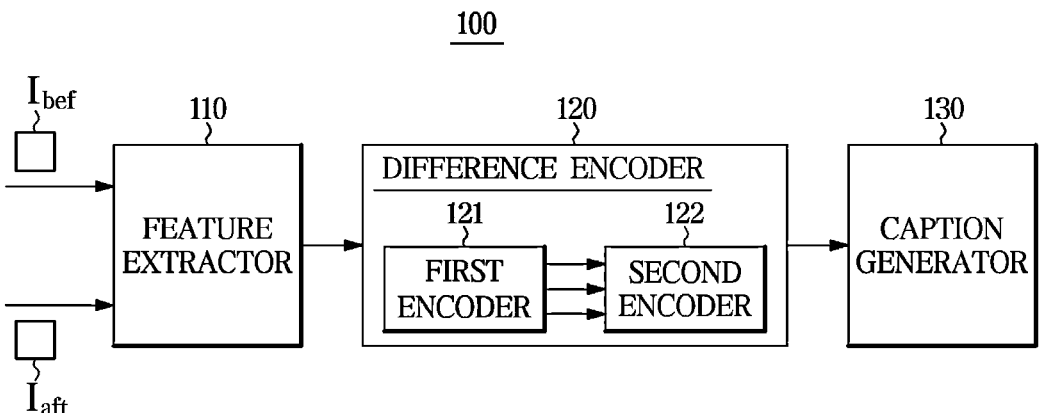
FIG. 5 is a block diagram illustrating operations of a difference encoder of an apparatus of training an image captioning model according to an exemplary embodiment of the present disclosure.

FIG. 3 is a block diagram illustrating operations of a training apparatus according to an exemplary embodiment of the present disclosure. FIG. 4 is a flowchart illustrating a training method according to an exemplary embodiment of the present disclosure. FIG. 5 is a block diagram illustrating operations of a difference encoder of a training apparatus according to an exemplary embodiment of the present disclosure.

A training method (a method of training an image captioning model) according to various exemplary embodiments of the present disclosure may be performed by a training apparatus (an apparatus of training an image captioning model) according to an exemplary embodiment of the present disclosure. That is, when operating the training apparatus according to an exemplary embodiment of the present disclosure, the training method according to various exemplary embodiments of the present disclosure may be performed.

Accordingly, a description on the training method is equally applicable to the training apparatus, even when not specifically described below. A description on the training apparatus may also be equally applied to the training method, even when not specifically described below.

Referring to FIG. 3, the training apparatus 100 according to various exemplary embodiments of the present disclosure may include a feature extractor 110 configured for extracting features from input images, a difference encoder 120 configured for identifying a difference between the images based on the extracted features and encoding the identified difference, and a caption generator 130 configured for generating a caption about image based on a result of encoding.

The training apparatus 100 according to various exemplary embodiments of the present disclosure may include at least one memory storing the image captioning model and a program for training the image captioning model, and a processor implementing the program stored in the memory to train the image captioning model.

Also, the at least one memory may store a training dataset used for training the image captioning model.

The feature extractor 110, the difference encoder 120, and the caption generator 130 may be implemented by a deep neural network (DNN). Here, the feature extractor 110, the difference encoder 120, and the caption generator 130 do not refer to physical constituent components, but refer to operations performed when the image captioning model stored in the memory is executed or operations performed while training the image captioning model.

That is, the feature extractor 110, the difference encoder 120, and the caption generator 130 may refer to a network structure of the image captioning model, and a program for operating the feature extractor 110, the difference encoder 120, and the caption generator 130 may be the image captioning model.

The image captioning model trained by the training apparatus 100 according to an exemplary embodiment of the present disclosure is a model generating a caption describing a difference between input images. Accordingly, two images different from each other, $I_{bef}$ and $I_{aft}$, may be input to the training apparatus 100 as a pair.

In the example, it is assumed that a pair of images input to the training apparatus 100 are images obtained by capturing a same scene at different points in time, and an image obtained earlier is referred to as a first image $I_{bef}$ and an image obtained later is referred to as a second image $I_{aft}$.

Referring to FIG. 4 and FIG. 5, the training method according to an exemplary embodiment of the present disclosure includes extracting a feature of the first image and a feature of the second image by the feature extractor 110 (1100), encoding viewpoint information based on the extracted first image's feature and the extracted second image's feature by a first encoder 121 (1200), generating a viewpoint-aligned feature of the first image and a viewpoint-aligned feature of the second image based on the encoded viewpoint information by a second encoder 122 (1300), and generating a caption describing a difference between the first image and the second image based on the generated features by the caption generator 130.

Hereinafter, the training method is described in greater detail.

Figure 6:
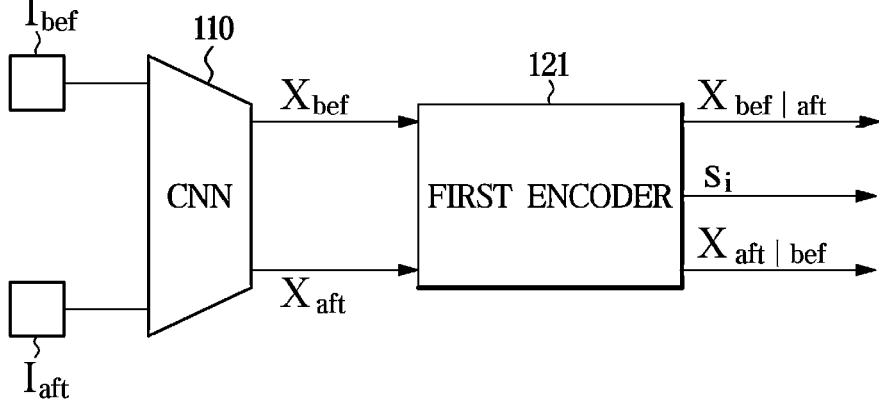
FIG. 6 and FIG. 7 are block diagrams illustrating operations of a difference encoder of a training apparatus according to an exemplary embodiment of the present disclosure.
Figure 7:
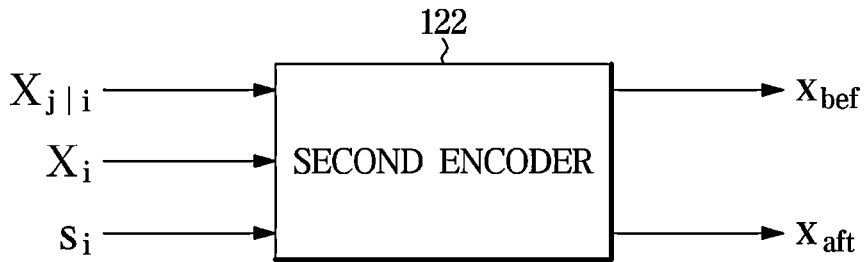

FIG. 6 and FIG. 7 are block diagrams illustrating operations of a difference encoder of a training apparatus according to an exemplary embodiment of the present disclosure.

As described above, the image captioning model trained by the training apparatus 100 according to an exemplary embodiment of the present disclosure is robust to a viewpoint change between images. That is, even though a viewpoint is changed between images, the image captioning model may exclude the viewpoint change and only recognize substantially semantic changes.

In the exemplary embodiment of the present disclosure, it may be considered that a semantic change between images has occurred, when an object existing in a before image is not present in an after image, when an object which was not present in a before image has been added to an after image, when a change in shape, size, or color of an object has occurred, or when a location of an object has changed.

To implement the image captioning model robust to a viewpoint change, the difference encoder 120 may include the first encoder 121 encoding viewpoint information of two images and the second encoder 122 encoding a difference except for a viewpoint difference of the two images.

Referring to FIG. 6, when two images $I_{bef}$ and $I_{aft}$ are input, the feature extractor 110 may be configured to generate a first feature map about the first image $I_{bef}$ and a second feature map about the second image $I_{aft}$.

The feature extractor 110 may be implemented as a convolutional neural network (CNN) and generate the feature maps by extracting features from an image including two-dimensional (2D) data.

When the two images $I_{bef}$, $I_{aft} \in R^{C \times H \times W}$ are input, an output of the feature extractor 110 may be expressed as $X_{bef}$, $X_{aft} \in R^{C' \times H' \times W'}$. Here, $X_{bef}$ denotes a first image's feature included in the first feature map, and $X_{aft}$ denotes a second image's feature included in the second feature map. The C, H, and W denote a channel, a height, and a width of input data, respectively.

The first image's feature $X_{bef}$ and the second image's feature $X_{aft}$ output from the feature extractor 110 may be input to the first encoder 121 encoding the viewpoint information.

The first encoder 121 may output a first image's feature $X_{bef\ 1\ aft}$ infused with the viewpoint information of the second image's feature $X_{aft}$ and a second image's feature $X_{aft}\ I_{bef}$ infused with the viewpoint information of the first image's feature $X_{bef}$ using the first image's feature $X_{bef}$ and the second image's feature $X_{aft}$.

Also, the first encoder 121 may be configured to generate a similarity map based on the first feature map and the second feature map, and output a potential feature $s_i$ as embedding of the similarity map.

Referring to FIG. 7, a feature $X_{j1i}$ infused with the viewpoint information and a feature $X_i$ not infused with the viewpoint information may be input to the second encoder 122 encoding information related to semantic changes except for the viewpoint difference between the two images.

Also, the embedding $s_i$ of the similarity map may be additionally input to the second encoder 122.

The second encoder 122 may encode a difference among the viewpoint-encoded features $X_{j1i}$. In the present instance, for encoding robust to viewpoint change, the features may be fused using a feature fusion technique, and a difference among the fused features may be computed. In the exemplary embodiment of the present disclosure, a module performing the above-described operation is referred to as a fused difference module.

Features $x_{bef}$ and $x_{aft}$ finally output from the second encoder 122 may indicate features with viewpoint aligned and with only semantically important differences left between the two images.

Hereinafter, operations of encoding a difference between the two images by the difference encoder 120 are described in detail with reference to FIG. 8 and FIG. 9.

Figure 8:
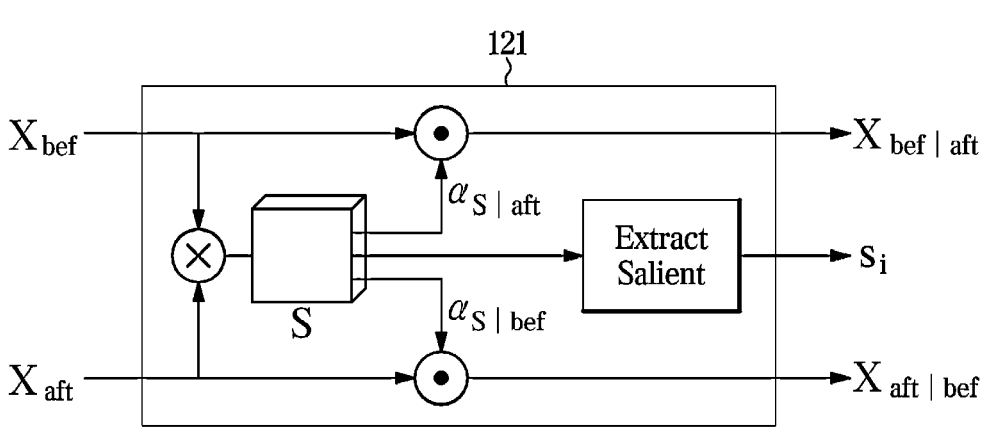
FIG. 8 and FIG. 9 are diagrams illustrating detailed network structures of a difference encoder of a training apparatus according to an exemplary embodiment of the present disclosure.
Figure 9:
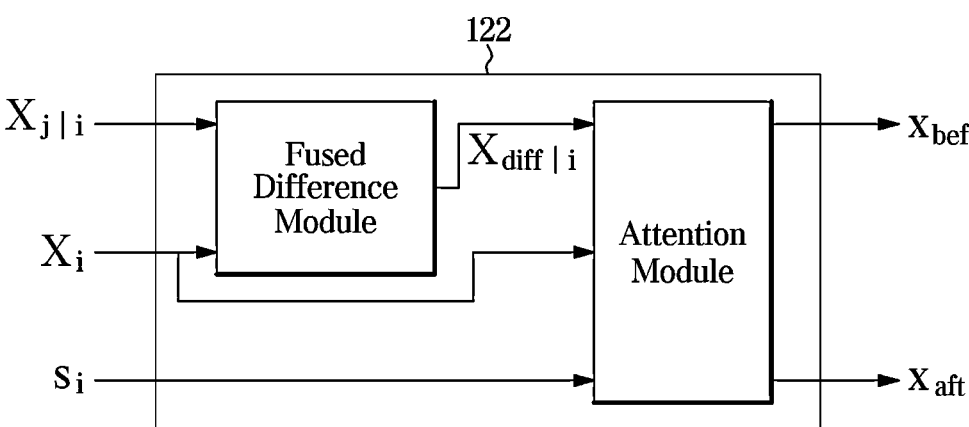

FIG. 8 and FIG. 9 are diagrams illustrating detailed network structures of a difference encoder of a training apparatus according to an exemplary embodiment of the present disclosure.

Referring to FIG. 8, to lessen a viewpoint difference, first encoder 121 may correlate pixels of a same object on the first image and the second image. To the present end, the first encoder 121 may compute similarities among all points of the first feature map and the second feature map as a pair, and obtain a similarity map $S \in R^{H'W' \times H'W'}$.

Even though the viewpoint difference exists between the two images, the same object has similar features in each of the two images. Accordingly, where an object in the first image is located in the second image may be identified by use of the similarity map.

The similarity map S obtained by the first encoder 121 may be expressed as, $$S = kF^T_{bef}F_{aft},\qquad \text{[Equation 1]}$$

Here, $F_i = \mathcal{F} X_i$, $i \in \{bef, aft\}$, $k \in R$, and k is a trainable parameter. $\mathcal{F}$ is an operator that flattens tensors from $R^{C \times H \times W'}$ to $R^{C \times H'W'}$.

By comparing locations of a same object existing in both images using the similarity map, the first encoder 121 may encode viewpoint information and generate viewpoint-encoded features.

By use of [Equation 1] above, the first encoder 121 may be configured to generate features ($X_{bef\backslash aft}$, $X_{aft\backslash bef} \in R^{C \times H \times W'}$) expressed as [Equation 2].

$$X_{j\backslash i} = \mathcal{F}^{-1}(F_j \alpha_{S\backslash i})\qquad \text{[Equation 2]}$$

Here, $\alpha_{S\backslash bef} = \text{softmax}_1(S)$, $\alpha_{S\backslash aft} = \text{softmax}_2(S)^T$, and (i, j) $\in \{$(bef, aft), (aft, bef)$\}$. $\text{Softmax}_n(S)$ applies softmax along an $n^{th}$ dimension of the similarity map S. $\mathcal{F}^{-1}$ is an operator that unflattens tensors from $R^{C \times H'W'}$ to $R^{C \times H' \times W'}$.

$\alpha_{S\backslash i} \in \mathbb{R}^{H'W' \times H'W'}$ may be an attention map including viewpoint information of the feature $X_i$ estimated from a location of object. Accordingly, the feature $X_{j1i}$ output from the first encoder 121 may be interpreted as the feature $X_j$ infused with the viewpoint information of the feature $X_i$. That is, $X_{bef\ 1\ aft}$ indicates the feature $X_{bef}$ infused with the viewpoint information of the feature $X_{aft}$, and $X_{aft\ 1\ bef}$ indicates the feature $X_{aft}$ infused with the viewpoint information of the feature $X_{bef}$.

Also, the first encoder 121 may obtain the potential feature $s_i \in R^{D \times H \times W'}$ as embedding of the similarity map. Based on an empirical observation for $\alpha_{S\backslash i}$, salient object matches tend to form visually recognizable clusters in the similarity map, while background matches are dispersed around the similarity map.

Because information required to encode a difference between two images is information related to salient objects, the first encoder 121 may obtain, from the similarity map S, a feature $s_i$ which is defined by, $$s_i = \frac{1}{H'W'} \sum_{H',W'} conv_1(\text{MaxPool}(conv_2(\alpha_{S\backslash i})))\qquad \text{[Equation 3]}$$

Here, $i \in \{bef, aft\}$, $conv_1$ and $conv_2$ denote 2D convolution using 3×3 kernel. Convolution may be applied after reshaping so that only a dimension corresponding to i may be affected.

For example, in case of I=aft, $\alpha_{S\backslash i} \in \mathbb{R}^{H'_1W'_1 \times H'_2W'_2}$ may be reshaped to $\mathbb{R}^{H'_2W'_2 \times 1 \times H'_1W'_1}$. Max pooling allows the network to preserve features of salient object while background information is reduced through downsampling.

To sum up, when the first image's feature $X_{bef}$ and the second image's feature $X_{aft}$ extracted by the feature extractor 110 are input, the first encoder 121 may be configured to generate the similarity map S using the first image's feature $X_{bef}$ and the second image's feature $X_{aft}$.

The first encoder 121 may obtain, from the similarity map S, an attention map $\alpha_{s\ 1\ bef}$ including the viewpoint information of the first image's feature $X_{bef}$ and an attention map $\alpha_{s\ 1\ alt}$ including the viewpoint information of the second image's feature $X_{aft}$.

Also, the first encoder 121 may obtain the feature $s_i$ in which information related to object is emphasized, from the similarity map S.

The first encoder 121 may obtain the feature $X_{bef\ 1\ aft}$ (the feature $X_{bef}$ infused with the viewpoint information of the feature $X_{aft}$), based on the first image's feature $X_{bef}$ and the attention map $\alpha_{s\ 1\ bef}$ including the viewpoint information of the first image's feature $X_{bef}$. Also, the first encoder 121 may obtain the feature $X_{aft\ 1\ bef}$ (the feature $X_{aft}$ infused with the viewpoint information of the feature $X_{bef}$), based on the second image's feature $X_{aft}$ and the attention map $\alpha_{s\ 1\ aft}$ including the viewpoint information of the second image's feature $X_{aft}$.

Referring to FIG. 9, the second encoder 122 may obtain fused features $\tilde{X}_{j1i}$ by fusing the features obtained by the first encoder 121 according to [Equation 4] below. Also, the second encoder 122 may compute difference features $x_{diff\ 1\ i}$ according to [Equation 5] below. Computation according to [Equation 4] and [Equation 5] may be performed in the fused difference module of the second encoder 122.

$$\tilde{X}_{j|i}=\text{ReLU}(\text{conv}_3([X_{bef|i}\odot X_{aft|i};X_{j|i}])) \quad \text{[Equation 4]}$$

$$X_{diff|i}=\tilde{X}_{aft|i}-\tilde{X}_{bef|i} \quad \text{[Equation 5]}$$

Here, $(i, j) \in \{(bef, aft), (aft, bef)\}$, and $\tilde{X}_{i|i}=X_i$. $\tilde{X}_{j|i}$ may be computed using a rectified linear unit (ReLU) which is an activation function.

The symbol; represents concatenation between two parameters, $\odot$ is an operator representing Hadamard product for fusing features, and $\text{conv}_3$ denotes 2D convolution using 1×1 kernel.

The second encoder 122 may be configured to determine which difference is required to be emphasized with reference to the fused features including information related to the two images, encoding semantically important differences regardless of viewpoint difference between the two images.

The difference features $x_{diff\ 1\ i}$ computed based on [Equation 5], the feature $X_i$ extracted by the feature extractor 110, and the feature $s_i$ obtained from the first encoder 121 (the feature $s_i$ in which information related to object is emphasized) may be input to an attention module performing an attention mechanism.

The attention module may obtain an attention map $\alpha_i$ and an embedding $x_i$ about each image, through computation according to [Equation 6] and [Equation 7] below. The $x_i$ may indicate a viewpoint-aligned feature of each image, i.e., an image's feature where a viewpoint difference is excluded.

$$\alpha_i = \sigma\big(\text{conv}_4\big(\text{ReLU}\big(\text{conv}_5\big([X_i; X_{diff|i}; s_i]\big)\big)\big)\big) \quad \text{[Equation 6]}$$

$$x_i = \sum_{H',W'} \alpha_i \odot X_i \quad \text{[Equation 7]}$$

Here, $i \in \{bef, aft\}$, $\sigma$ denotes a sigmoid function, $\text{conv}_4$ denotes 2D convolution using 1×1 kernel, and $\text{conv}_5$ denotes 2D convolution using 3×3 kernel.

To sum up, by use of the features obtained by encoding the viewpoint information by the first encoder 121, the second encoder 122 may obtain a feature $x_{bef}$ of the first image whose viewpoint is aligned with the second image, and a feature $x_{aft}$ of the second image whose viewpoint is aligned with the first image.

Figure 10:
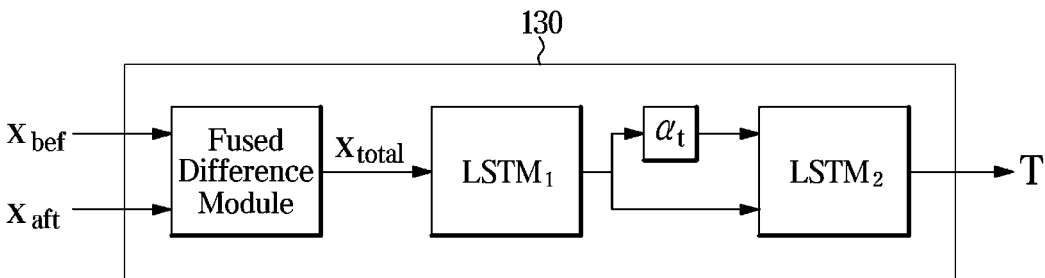
FIG. 10 is a diagram illustrating a detailed network structure of a caption generator of a training apparatus according to an exemplary embodiment of the present disclosure.

FIG. 10 is a diagram illustrating a detailed network structure of a caption generator of a training apparatus according to an exemplary embodiment of the present disclosure.

Referring to FIG. 10, the caption generator 130 may be configured to generate a caption describing a difference between the two images, by use of the first image's viewpoint-aligned feature $x_{bef}$ and the second image's viewpoint-aligned feature $x_{aft}$ output from the second encoder 122 according to the above-described operations.

The caption generator 130 does not simply use the features $x_{bef}$ and $x_{aft}$ to generate the caption, but fuses the two features by applying a fused difference module and determines a feature $x_{diff}$ indicating the difference between the two images using the fused features, focusing more on the difference between the two images.

The fused difference module of the caption generator 130 may obtain fused features $\tilde{x}_i$ by fusing the features obtained by the difference encoder 120 according to [Equation 8] below, and obtain a difference feature $x_{diff}$ by determining a difference between the fused features $\tilde{x}_i$ according to [Equation 9] below.

Also, the difference feature $x_{diff}$ and the viewpoint-aligned features $x_{bef}$, $x_{aft}$ are concatenated according to [Equation 10], obtaining a final feature $x_{total}$.

$$\tilde{x}_i=\text{ReLU}(\text{FC}([x_{bef}\odot x_{aft};x_i])) \quad \text{[Equation 8]}$$

$$x_{diff}=\tilde{x}_{aft}-\tilde{x}_{bef} \quad \text{[Equation 9]}$$

$$x_{total}=\text{ReLU}(\text{FC}([x_{bef};x_{diff};x_{aft}])) \quad \text{[Equation 10]}$$

Here, $i \in \{bef, aft\}$. To accurately identify the difference between the two images, not only individually analyzing the first image and the second image, but also analyzing the two images as a whole are required. To the present end, the caption generator 130 may perform $x_{bef}\odot x_{aft}$ computation for fusing the features, as defined in [Equation 8] above.

When the computations are performed according to [Equation 8], [Equation 9] and [Equation 10], the fused difference module may output the final feature $x_{total}$ where all the three features $x_{bef}$, $x_{diff}$, $x_{aft}$ are concatenated.

The caption generator 130 may covert the final feature $x_{total}$ indicating the difference between the two images into text by applying a recurrent neural network (RNN) and attention mechanism.

In an exemplary embodiment of the present disclosure, the caption generator 130 may transform and apply a top-down captioning model, and a process of converting the final feature $x_{total}$ into text may be expressed as [Equation 11], [Equation 12], [Equation 13] and [Equation 14] below.

$$h_t^1 = LSTM_1\big(\big[x_{total}; h_{t-1}^2\big], h_{t-1}^1\big) \quad \text{[Equation 11]}$$

$$\alpha_t = \text{softmax}\big(FC\big(h_t^1\big)\big) \quad \text{[Equation 12]}$$

$$h_t^2 = LSTM_2\Big(\Big[\sum_i \alpha_t[i] \cdot x_i; Ew_{t-1}\Big], h_{t-1}^2\Big) \quad \text{[Equation 13]}$$

$$w_t \sim \text{softmax}\big(FC\big(h_t^2\big)\big) \quad \text{[Equation 14]}$$

Here, $i \in \{bef, diff, aft\}$, E denotes a word embedding matrix, $h_t^1$ and $h_t^2$ denote hidden states of long short term memory (LSTM), and $\omega_t$ denotes a word sampled at a time point t.

Figure 11:
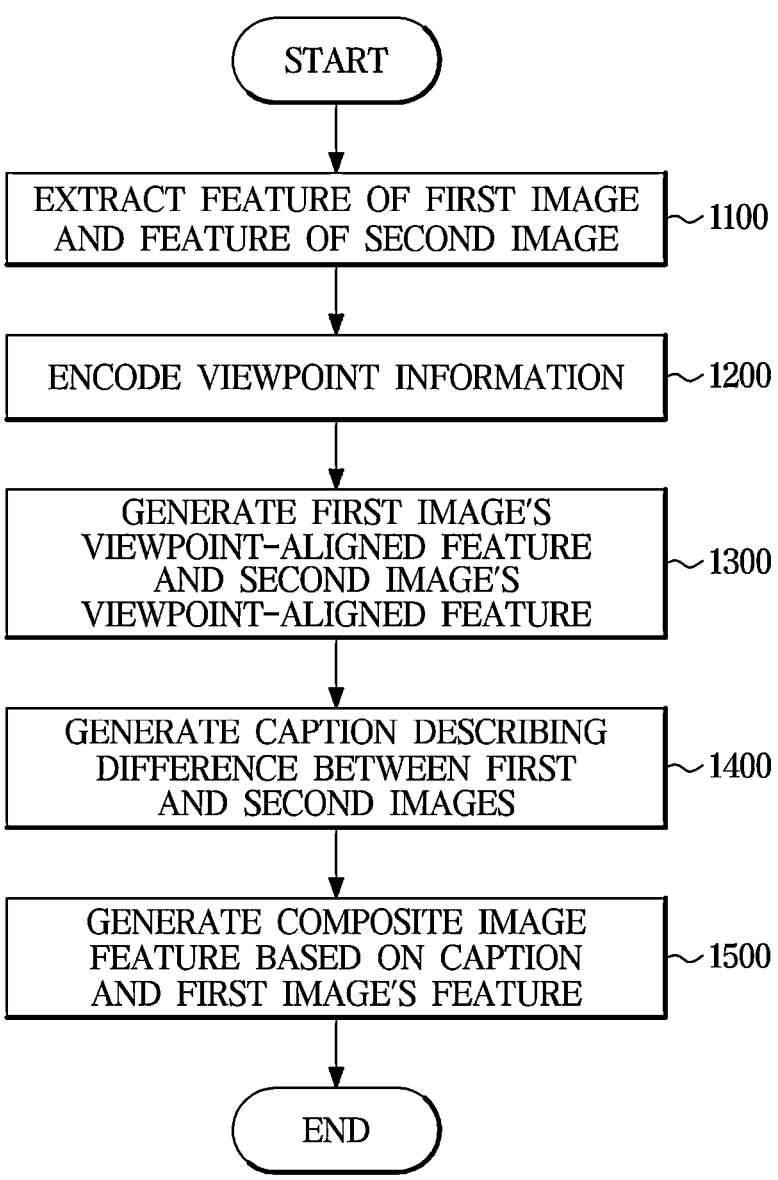
FIG. 11 is another flowchart illustrating a method of training an image captioning model according to an exemplary embodiment of the present disclosure.
Figure 12:
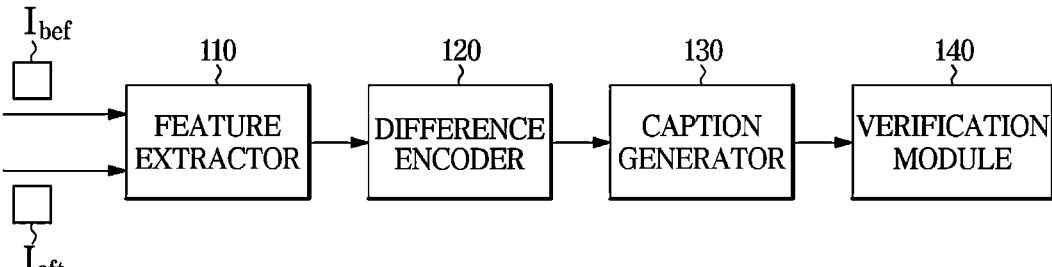
FIG. 12 is another block diagram illustrating operations of an apparatus of training an image captioning model according to an exemplary embodiment of the present disclosure.

FIG. 11 is another flowchart illustrating a training method according to an exemplary embodiment of the present disclosure. FIG. 12 is another block diagram illustrating operations of a training apparatus according to an exemplary embodiment of the present disclosure.

Referring to FIG. 11, in addition to the above-described operations, the training method according to various exemplary embodiments of the present disclosure may further include generating a composite image feature (1500) based on the generated caption and the first image's feature, to verify whether the caption generated by the caption generator 130 accurately describes the difference between the two images.

To the present end, as shown in FIG. 12, the training apparatus 100 according to various exemplary embodiments of the present disclosure may further include a verification module 140.

Because the caption generated by the caption generator 130 describes the difference between the first and second images, if the caption is accurately generated, theoretically, an image obtained by modifying the first image according to the caption is required to match the second image.

Accordingly, the verification module 140 may be configured to generate the composite image feature by applying the caption generated by the caption generator 130 to the first image's feature.

As the composite image feature generated by the verification module 140 is more similar to the actual feature of the second image, it may be determined that the caption generated by the caption generator 130 accurately describes the difference between the first image and the second image.

The image captioning model trained by the training method and the training apparatus 100 according to various exemplary embodiments of the present disclosure may improve a captioning quality through the above verification process.

Figure 13:
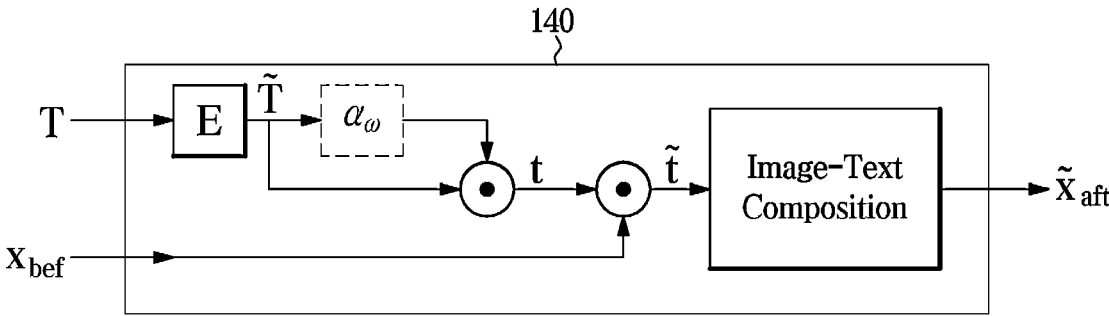
FIG. 13 is a diagram illustrating a detailed network structure of a verification module of an apparatus of training an image captioning model according to an exemplary embodiment of the present disclosure.

FIG. 13 is a diagram illustrating a detailed network structure of a verification module of a training apparatus according to an exemplary embodiment of the present disclosure.

Referring to FIG. 13, the verification module 140 may encode the caption $T=[w_1, w_2, \ldots, w_l]$ generated by the caption generator 130, together with an word embedding matrix E, obtaining $\tilde{T}=[\tilde{w}_1, \tilde{w}_2, \ldots, \tilde{w}_l] \in \mathbb{R}^{l \times E}$ (i.e., $\tilde{w}_i=Ew_i$).

In general, captions include relatively less important words. Accordingly, to assign different weights to each word, a caption embedding $t \in \mathbb{R}^C$ may be expressed as [Equation 15] and [Equation 16] below.

$$\alpha_w = \text{softmax}(FC(ReLU(FC(v \odot \tilde{w})))) \qquad \text{[Equation 15]}$$

$$t = FC\left(\sum_l \alpha_w[l] \cdot \tilde{w}_l\right) \qquad \text{[Equation 16]}$$

Here, v is a trainable parameter.

Also, the verification module 140 may be configured to generate a composite image feature $\tilde{x}_{aft}$ by fusing the caption embedding $t \in \mathbb{R}^C$ and the first image's feature $x_{bef}$ by applying a transformation of text image residual gating (TIRG) method. A process of generating the composite image feature may be expressed as [Equation 17] to [Equation 20] below.

$$\tilde{t}=[t;x_{bef}t] \qquad \text{[Equation 17]}$$

$$f_g=\sigma(FC(ReLU([x_{bef};\tilde{t}]))) \odot x_{bef} \qquad \text{[Equation 18]}$$

$$f_r=FC(ReLU(FC(ReLU([x_{bef};\tilde{t}])))) \qquad \text{[Equation 19]}$$

$$\tilde{x}_{aft}=w_g f_g+w_r f_r \qquad \text{[Equation 20]}$$

Here, $\omega_g$ and $\omega_r$ are trainable parameters. As the composite image feature $\tilde{x}_{aft}$ is more similar to the actual second image's feature $x_{aft}$, it may be determined that the image captioning model has a higher performance.

Figure 14:
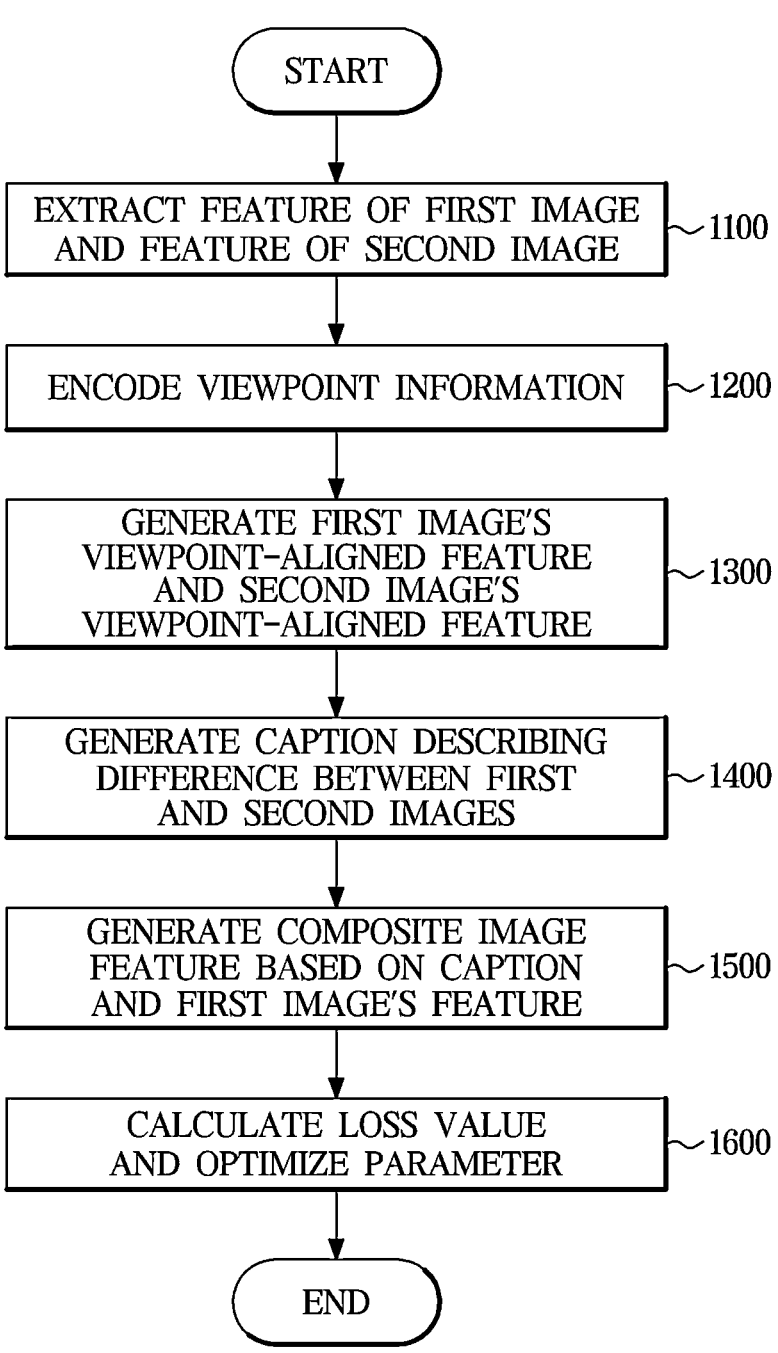
FIG. 14 is yet another flowchart illustrating a method of training an image captioning model according to an exemplary embodiment of the present disclosure.
Figure 15:
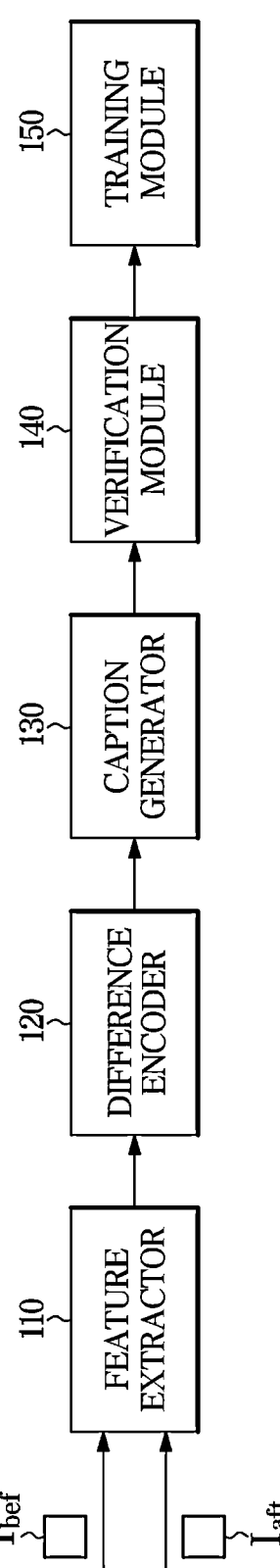
FIG. 15 is yet another block diagram illustrating operations of an apparatus of training an image captioning model according to an exemplary embodiment of the present disclosure.

FIG. 14 is yet another flowchart illustrating a training method according to an exemplary embodiment of the present disclosure. FIG. 15 is yet another block diagram illustrating operations of a training apparatus according to an exemplary embodiment of the present disclosure.

Referring to FIG. 14, in addition to the above-described operations, the training method according to various exemplary embodiments of the present disclosure may further include determining a loss value and optimizing a parameter based on the loss value (1600) for training the image captioning model.

To the present end, as shown in FIG. 15, the training apparatus 100 according to various exemplary embodiments of the present disclosure may further include a training module 150.

The training module 150 may train the above-described image captioning model, i.e., a network of the feature extractor 110, the difference encoder 120, the caption generator 130 and the verification module 140 described above, in a direction to minimize an error between a target caption T* and the caption T generated by the caption generator 130.

Also, the training module 150 may train the image captioning model in a direction to minimize an error between the composite image feature $\tilde{x}_{aft}$ generated by the verification module 140 and the actual feature $x_{aft}$ of the second image.

First, the error between the target caption T* and the caption T generated by the caption generator 130 may be expressed as a loss function defined in [Equation 21] below. Here, a cross-entropy function is used as the loss function.

$$\mathcal{L}_{XE} = -\sum_t \log(p_\theta(w_t^* \mid w_{1x-1}^*)) \qquad \text{[Equation 21]}$$

Here, $\theta$ denotes all parameters of the network. All the parameters of the network may include weights and biases.

The error between the composite image feature $\tilde{x}_{aft}$ generated by the verification module 140 and the actual feature $x_{aft}$ of the second image may be expressed as a loss function defined in [Equation 22] below.

$$\mathcal{L}_{cycle} = -\frac{1}{B}\sum_i \log \frac{\exp(\tilde{x}_{aft,i} \cdot x_{aft,i})}{\sum_j \exp(\tilde{x}_{aft,i} \cdot x_{aft,j})} \qquad \text{[Equation 22]}$$

Here, a loss value is determined using the cross-entropy function with a mini-batch size as B for a ground truth pair $\{(\tilde{x}_{aft,i}, x_{aft,i})\}_{i=1}^B$.

Also, to suppress unnecessary activation, the training module 150 may be configured to determine a loss value $\mathcal{L}_{reg}$ defined by [Equation 23] below, as a regularization term of the attention map $\alpha_i$.

$$\mathcal{L}_{reg} = \frac{1}{B}\sum_{all} |\alpha_{bef}| + \frac{1}{B}\sum_{all} |\alpha_{aft}|. \qquad \text{[Equation 23]}$$

The training module 150 may sum the first loss value determined by [Equation 1], the second loss value determined by [Equation 2], and the third loss value determined by [Equation 3], obtaining a final loss value $\mathcal{L}$ according to [Equation 24] below.

$$\mathcal{L} = \mathcal{L}_{XE} = \lambda_{cycle}\mathcal{L}_{cycle} = \lambda_{reg}\mathcal{L}_{reg} \qquad \text{[Equation 24]}$$

Here, $\lambda_{cycle}$ and $\lambda_{reg}$ are hyperparameters.

The training module 150 may adjust parameters of the network in a direction to minimize the final loss value where both the error between the target caption T* and the caption T generated by the caption generator 130 and the error between the composite image feature $\tilde{x}_{aft}$ generated by the verification module 140 and the actual feature $x_{aft}$ of the second image are reflected, to train the image captioning model.

The network's parameters optimized during the training process may include weights or biases of neural network implementing at least one of the feature extractor 110, the difference encoder 120 or the caption generator 130.

According to the above-described embodiment, when training the image captioning model, by reflecting not only the error between the caption generated by the image captioning model and a ground truth caption, but also the error between the composite image feature $\tilde{x}_{aft}$ generated by the verification module 140 and the actual feature $x_{aft}$ of the second image, a performance of the image captioning model may be improved.

Hereinafter, an image captioning device and an image captioning method using the image captioning model, trained by the training method and the training apparatus 100 described above, are described.

Figure 16:
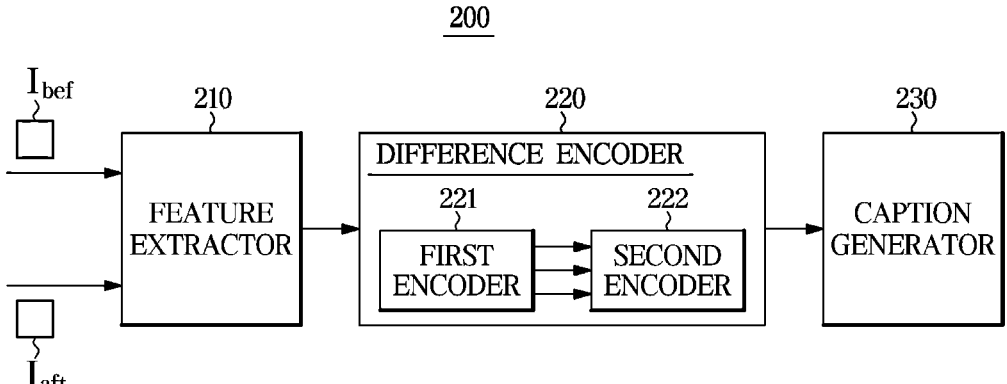
FIG. 16 is a block diagram illustrating operations of an image captioning device according to an exemplary embodiment of the present disclosure.
Figure 17:
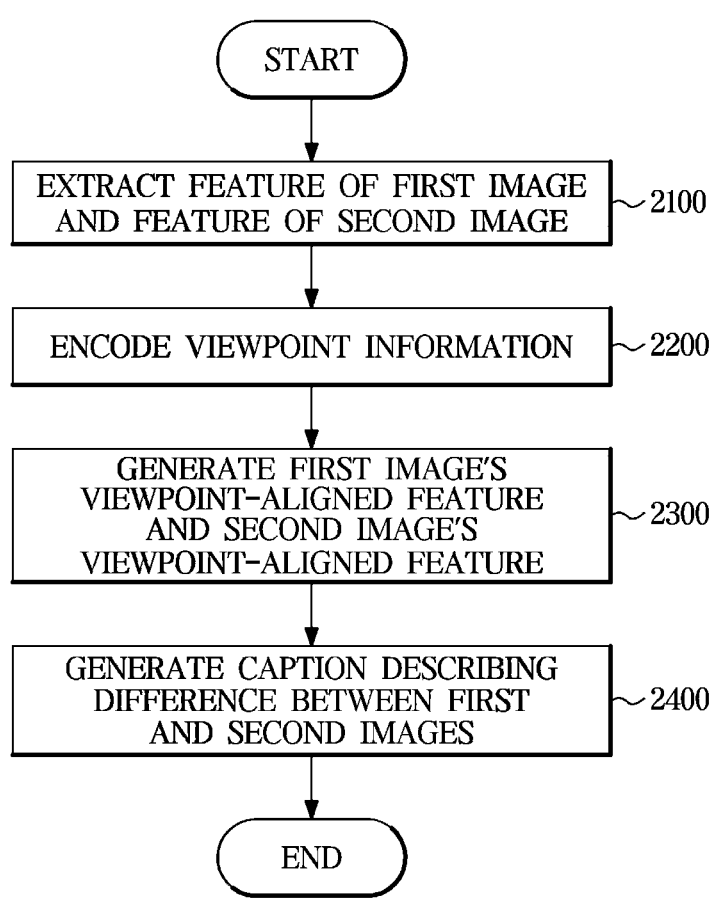
FIG. 17 is a flowchart illustrating an image captioning method according to an exemplary embodiment of the present disclosure.

FIG. 16 is a block diagram illustrating operations of an image captioning device according to an exemplary embodiment of the present disclosure. FIG. 17 is a flowchart illustrating an image captioning method according to an exemplary embodiment of the present disclosure.

The image captioning device according to various exemplary embodiments of the present disclosure may be configured to generate a caption for an input image by applying the image captioning model trained according to the above-described embodiment. The image captioning device may be configured to generate a caption describing a difference between a first image and a second image which are input at different points in time.

The image captioning method according to various exemplary embodiments of the present disclosure may be performed by the image captioning device according to an exemplary embodiment of the present disclosure, and may use the image captioning model trained according to the above-described embodiment.

Referring to FIG. 16, an image captioning device 200 according to an exemplary embodiment of the present disclosure includes a feature extractor 210, a difference encoder 220 and a caption generator 230.

The image captioning device 200 may include at least one memory storing a program performing the operations to be described later and at least one processor implementing a stored program.

The feature extractor 210, the difference encoder 220 and the caption generator 230 may be implemented by a deep neural network (DNN). Here, the feature extractor 210, the difference encoder 220 and the caption generator 230 do not refer to physical constituent components, but refer to operations performed when the image captioning model stored in the memory is executed.

That is, the feature extractor 210, the difference encoder 220 and the caption generator 230 may refer to a network structure of the image captioning model, and a program for operating the feature extractor 210, the difference encoder 220 and the caption generator 230 may be the image captioning model.

Detailed operations of the feature extractor 210, the difference encoder 220 and the caption generator 230 are described below together with an exemplary embodiment of the image captioning method.

Referring to FIG. 17, the image captioning method according to an exemplary embodiment of the present disclosure includes extracting a feature of an input first image and a feature of an input second image (2100).

When the first image $I_{bef}$ and the second image $I_{aft}$ are input, the feature extractor 210 may extract a feature from the image including 2D data, and generate a feature map. A first feature map may be generated from the first image, and a second feature map may be generated from the second image. For example, the feature extractor 210 may be implemented as a CNN.

The first image and the second image may be images capturing a same scene at different points in time. In the present instance, a viewpoint of camera may be changed when capturing the first image and the second image.

When the two images $I_{bef}$, $I_{aft} \in R^{C \times H \times W}$ are input, an output of the feature extractor 210 may be expressed as $X_{bef}$, $X_{aft} \in R^{C' \times H' \times W'}$. Here, $X_{bef}$ denotes a first image's feature included in the first feature map, and $X_{aft}$ denotes a second image's feature included in the second feature map.

Viewpoint information may be encoded based on the extracted first image's feature and second image's feature (2200).

Referring again to FIG. 13, the difference encoder 220 may include a first encoder 221 encoding the viewpoint information. The first encoder 221 may output a first image's feature $X_{bef\,1\,aft}$ infused with the viewpoint information of the second image's feature $X_{aft}$ and a second image's feature $X_{aft\,1\,bef}$ infused with the viewpoint information of the first image's feature $X_{bef}$ by use of the first image's feature $X_{bef}$ and the second image's feature $X_{aft}$.

Also, the first encoder 221 may be configured to generate a similarity map based on the first feature map and the second feature map, and output a potential feature $s_i$ as embedding of the similarity map.

A viewpoint-aligned feature of the first image and a viewpoint-aligned feature of the second image are generated based on the encoded viewpoint information (2300).

Referring again to FIG. 16, the difference encoder 220 may further include a second encoder 222 encoding information related to semantic changes except for the viewpoint difference between the two images.

A feature $X_{j1i}$ infused with the viewpoint information and a feature $X_i$ not infused with the viewpoint information may be input to the second encoder 222. Also, the embedding $s_i$ of the similarity map may be additionally input to the second encoder 222.

The second encoder 222 may encode a difference among the viewpoint-encoded features $X_{j1i}$. In the present instance, for encoding robust to viewpoint change, a fused difference module that fuses the obtained differences and determines the difference may be used.

Features $x_{bef}$ and $x_{aft}$ finally output from the second encoder 222 may indicate features with viewpoint aligned and with only semantically important differences left between the two images.

A caption describing a difference between the first and second images is generated based on the first image's viewpoint-aligned feature and the second image's viewpoint-aligned feature (2400).

The caption generator 230 may compute a difference feature $x_{diff}$ indicating the difference between the two images using the features obtained by the difference encoder 220, and generate the caption describing the difference between the two images based on the determined difference feature.

To accurately identify the difference between the two images, not only individually analyzing the first image and the second image, but also analyzing the two images as a whole are required. To the present end, the caption generator 230 may output a final feature $x_{total}$ where all the three features $x_{bef}$, $x_{diff}$, $x_{aft}$ are fused.

The caption generator 230 may covert the final feature $x_{total}$ indicating the difference between the two images into text by applying a recurrent neural network (RNN) and attention mechanism.

A description on the detailed network structures and equations applied in each operation of the above-described image captioning method is the same as that described in the above training method, and thus a detailed description thereof is omitted.

Figure 18:
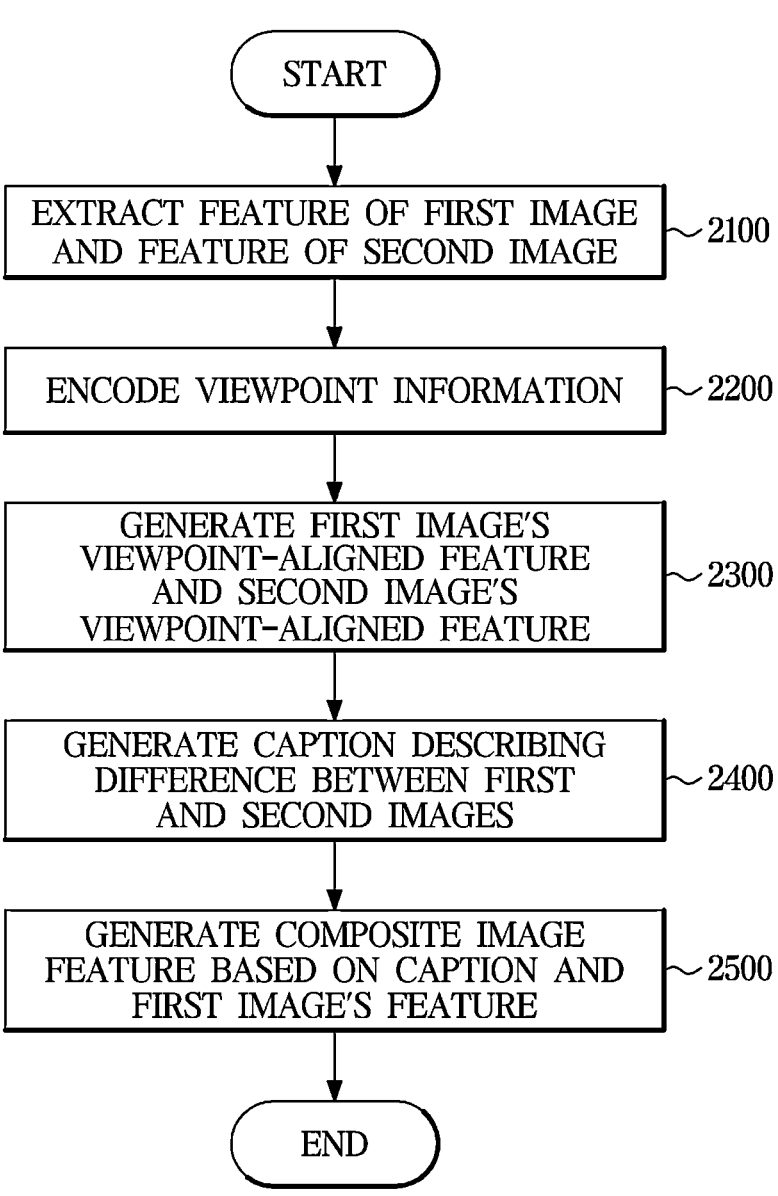
FIG. 18 is another flowchart illustrating an image captioning method according to an exemplary embodiment of the present disclosure.
Figure 19:
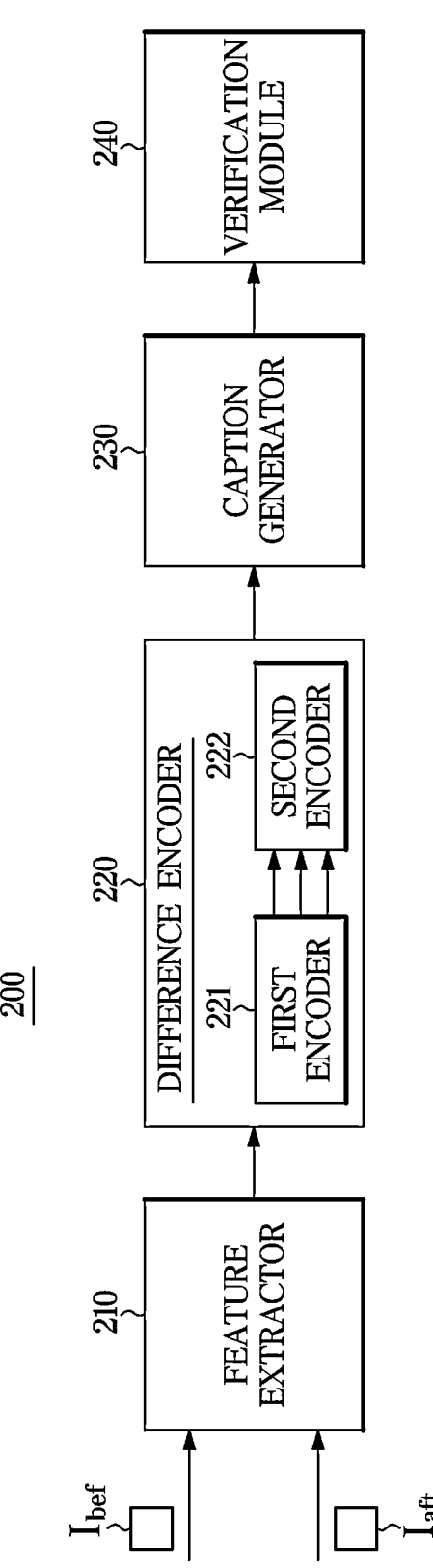
FIG. 19 is another block diagram illustrating operations of an image captioning device according to an exemplary embodiment of the present disclosure.

FIG. 18 is another flowchart illustrating an image captioning method according to an exemplary embodiment of the present disclosure. FIG. 19 is another block diagram illustrating operations of an image captioning device according to an exemplary embodiment of the present disclosure.

Referring to FIG. 18, in addition to the above-described operations, the image captioning method according to various exemplary embodiments of the present disclosure may further include a verification process of generating a composite image feature (2500) based on the generated caption and the first image's feature.

To the present end, as shown in FIG. 19, the image captioning device 200 may further include a verification module 240 generating the composite image feature.

If the caption accurately describes the difference between the first and second images, theoretically, a feature of an image obtained by modifying the first image according to the caption is required to be identical to a feature of the second image.

Accordingly, as the composite image feature $\tilde{x}_{aft}$ generated by composition of the caption and the first image's feature $x_{bef}$ by the verification module 240 is more similar to the second image's feature $x_{aft}$, it may be determined that the image captioning model applied to the image captioning method has a higher performance.

A detailed operation of generating the composite image feature by the verification module 240 is the same as the above-described operation of the verification module 140 of the training apparatus 100, and thus a description thereof is omitted.

FIG. 20 and FIG. 21 are tables showing experiment results for evaluating a performance of an image captioning model trained according to an exemplary embodiment of the present disclosure.

An image captioning model used in the experiment is an image captioning model trained by the training method and the training apparatus 100 according to an exemplary embodiment of the present disclosure.

For training of the image captioning model, 48000 pairs of a first image $I_{bef}$ and a second image $I_{aft}$ including a size of 480×320 were generated and used as a training dataset. Also, the first image $I_{bef}$ and the second image $I_{aft}$ were generated to have an extreme viewpoint difference.

Out of the 48000 pairs of the first image $I_{bef}$ and the second image $I_{aft}$, 85% of the image pairs were used for training, 5% of image pairs were used for verification, and 10% of image pairs were used for testing.

Also, 8000 pairs of images simulating color change, texture change, addition, removal and rearrangement of object, and perspective change were generated and used as a training dataset. Coordinates (x, y, z) representing a location of a camera were randomly sampled, and the camera was relocated with respect to every second image.

To evaluate the image captioning model, CIDEr, BLEU-4, METEOR and SPICE, which are metrics generally used for image captioning, were used.

Dual dynamic attention model (DUDA) and mirrored viewpoint-adapted matching (M-VAM) were used as a base model to compare with the image captioning model trained according to an exemplary embodiment of the present disclosure.

In the description below, DUDA is referred to as a comparative example 1, and M-VAM is referred to as a comparative example 2. The image captioning model trained according to an exemplary embodiment of the present disclosure is referred to as an exemplary embodiment 1 or an exemplary embodiment 2.

The exemplary embodiment 1 refers to the image captioning model trained without the verification module 140 of the training apparatus 100. That is, the image captioning model of the exemplary embodiment 1 does not include a network structure corresponding to the verification module 140 or 240.

The exemplary embodiment 2 refers to the image captioning model trained by including the verification module 140. That is, the image captioning model of the exemplary embodiment 2 includes a network structure corresponding to the verification module 140 or 240.

Unlike the exemplary embodiment 1 and embodiment 2, the comparative example 1 and the comparative example 2 neither use a fused difference, nor encode viewpoint information.

FIG. 20 is a table showing scores of each metric for the image captioning models of the comparative example 1, the comparative example 2 and the exemplary embodiment 1. Referring to the table of FIG. 20, it may be confirmed that a score of the exemplary embodiment 1 is the highest.

FIG. 21 is a table showing scores of each metric for the image captioning models of a comparative example 3, a comparative example 4 and the exemplary embodiment 2. The comparative example 3 is a model where the network structure corresponding to the verification module 140 is added to the comparative example 1, and the comparative example 4 is a model where the network structure corresponding to the verification module 140 is added to the comparative example 2.

Referring to the table of FIG. 21, it may be confirmed that a score of the exemplary embodiment 2 is the highest.

Also, comparing the tables of FIG. 20 and FIG. 21, it may be confirmed that a higher score is provided to the image captioning model including the network structure corresponding to the verification module 140 or 240.

FIG. 22 is a graph showing an experiment result for evaluating a performance of an image captioning model trained according to an exemplary embodiment of the present disclosure.

A graph at the top portion of FIG. 22 shows correct answer rates depending on a cosine distance between first and following locations of a camera, and a graph shown below shows CIDEr scores depending on a cosine distance between first and following locations of a camera.

Both the correct answer rates and the CIDEr scores were obtained for the image captioning models of the comparative example 1, the comparative example 2 and the exemplary embodiment 2, and each value was obtained in units of 10%. A dotted line represents a mean value, and an error bar represents a standard deviation.

Referring to the correct answer rate graph, it may be confirmed in all the models that the correct answer rates decreases, as the cosine distance of the camera location increases. It may be estimated that such results are caused by an increase in difficulty of image captioning, as a viewpoint difference increases.

However, it may be confirmed that the correct answer rate of the image captioning model of the exemplary embodiment 2 is the highest, regardless of the cosine distance of the camera location.

Referring to the CIDEr score graph, only the image captioning model of the exemplary embodiment 2 does not show a clear score decrease, with the increase in cosine distance of the camera location. Also, standard deviations of the comparative example 1, the comparative example 2, and the exemplary embodiment 2 are 2.42, 3.21 and 2.28, respectively. That is, it may be confirmed that the image captioning model of the exemplary embodiment 2 has the highest CIDEr score and the lowest standard deviation.

Referring to the above experiment results, it may be seen that the image captioning model trained according to various exemplary embodiments of the present disclosure may provide image captioning results robust to viewpoint change.

FIG. 23, FIG. 24 and FIG. 25 are diagrams showing image captioning results obtained by an image captioning model trained according to an exemplary embodiment of the present disclosure.

In the experiment, the image captioning model according to the exemplary embodiment 2, the image captioning model according to the comparative example 1 and the image captioning model according to the comparative example 2 are applied to before images (first image), shown in the left of FIG. 23, FIG. 24 and FIG. 25, and after images (second image) shown in the right of FIG. 23, FIG. 24 and FIG. 25.

Referring to FIG. 23, a significant change in viewpoint between the first and second images exists, and a small spherical yellow object in the first image has turned green in the second image. Other than that, no other change is found.

As a result of applying the image captioning model according to the comparative example 1, a caption "the object in front of the large cyan thing and left of the big cyan cylinder in the perspective of the before image changed its location" was generated. That is, the image captioning model according to the comparative example 1 generated an incorrect caption describing that a location of object has changed.

As a result of applying the image captioning model according to the comparative example 2, a caption "the small yellow sphere changed to yellow" was generated. That is, the image captioning model according to the comparative example 2 generated an incorrect caption describing that a spherical object has changed from yellow to yellow.

As a result of applying the image captioning model according to the exemplary embodiment 2, a caption "the small red shiny object changed to green" was generated. That is, the image captioning model according to the exemplary embodiment 2 generated an accurate caption describing a change between the two images, despite the viewpoint change between the first image and the second image.

Referring to FIG. 24, a significant change in viewpoint between the first and second images exists, and a spherical yellow object in the first image has disappeared in the second image. Other than that, no other change is found.

As a result of applying the image captioning model according to the comparative example 1, a caption "the large cylinder became cyan" was generated. That is, the image captioning model according to the comparative example 1 failed to detect the disappearance of the object and generated an incorrect caption describing that a color of the object which remains unchanged has changed. A color of the cylindrical object is cyan in the first image as well.

As a result of applying the image captioning model according to the comparative example 2, a caption "the other brown rubber object that is the same size as the green rubber cylinder is missing" was generated. That is, the image captioning model according to the comparative example 2 generated an incorrect caption about the disappeared object.

As a result of applying the image captioning model according to the exemplary embodiment 2, a caption "the yellow sphere is missing" was generated. That is, the image captioning model according to the exemplary embodiment 2 generated an accurate caption describing a change between the two images, despite the viewpoint change between the first image and the second image.

Referring to FIG. 25, a significant change in viewpoint between the first and second images exists. Other than that, no other change is found.

As a result of applying the image captioning model according to the comparative example 1, a caption "the object that is in front of the matte block and left of the small gray object in the perspective of the before image became gray" was generated. That is, the image captioning model according to the comparative example 1 generated an incorrect caption describing that a color of the object in the first image has changed.

As a result of applying the image captioning model according to the comparative example 2, a caption "the large cube in front of the gray object in the perspective of the before image changed its location" was generated. That is, the image captioning model according to the comparative example 2 generated an incorrect caption describing that a location of the object in the first image has changed.

As a result of applying the image captioning model according to the exemplary embodiment 2, a caption "the two scenes seem identical" was generated. That is, the image captioning model according to the exemplary embodiment 2 generated an accurate caption describing a change between the two images, despite the viewpoint change between the first image and the second image.

As is apparent from the above, according to the exemplary embodiments of the present disclosure, the method of training an image captioning model and the computer-readable recording medium storing a program for implementing an image captioning method can accurately generate a sentence describing semantic changes, without being affected by a viewpoint change between two images.

Meanwhile, embodiments of the method of training an image captioning model and the image captioning method may be stored in a form of a recording medium storing computer-executable instructions. That is, instructions for implementing the method of training an image captioning model and the image captioning method may be stored in the recording medium.

The instructions may be stored in a form of a program code, and when executed by a processor, the instructions may perform operations of the disclosed exemplary embodiments of the present disclosure.

The recording medium may be implemented as a computer-readable non-transitory medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of training an image captioning model, the method comprising:
   extracting a feature of a first image from the first image and extracting a feature of a second image from the second image;
   by encoding viewpoint information based on the feature of the first image and the feature of the second image, obtaining a first image's feature including viewpoint information and a second image's feature including the viewpoint information;
   obtaining a viewpoint-aligned feature of the first image and a viewpoint-aligned feature of the second image, based on the first image's feature including the viewpoint information and the second image's feature including the viewpoint information; and
   generating a caption describing a difference between the first image and the second image, based on the viewpoint-aligned feature of the first image and the viewpoint-aligned feature of the second image.

2. The method of claim 1,
   wherein the first image's feature including the viewpoint information indicates a first image's feature infused with the viewpoint information of the second image, and
   wherein the second image's feature including the viewpoint information indicates a second image's feature infused with the viewpoint information of the first image.

3. The method of claim 1, wherein the obtaining of the first image's feature including the viewpoint information and the second image's feature including the viewpoint information includes:
   generating a similarity map based on the feature of the first image and the feature of the second image, and
   encoding the viewpoint information by comparing locations of an object existing in the first image and the second image based on the similarity map.

4. The method of claim 1, wherein the obtaining of the viewpoint-aligned feature of the first image and the viewpoint-aligned feature of the second image includes:
   obtaining fused features by fusing the first image's feature including the viewpoint information and the second image's feature including the viewpoint information.

5. The method of claim 4, wherein the obtaining of the viewpoint-aligned feature of the first image and the viewpoint-aligned feature of the second image further includes:
   obtaining a difference feature indicating the difference between the first image and the second image by determining a difference among the obtained fused features.

6. The method of claim 5, wherein the obtaining of the viewpoint-aligned feature of the first image and the viewpoint-aligned feature of the second image further includes:

obtaining the viewpoint-aligned feature of the first image and the viewpoint-aligned feature of the second image by applying an attention mechanism to the fused features and the difference feature.

7. The method of claim 1, wherein the generating of the caption includes obtaining fused features by fusing the viewpoint-aligned feature of the first image and the viewpoint-aligned feature of the second image.

8. The method of claim 7, wherein the generating of the caption further includes obtaining a difference feature indicating the difference between the first image and the second image by determining a difference among the obtained fused features.

9. The method of claim 8, wherein the generating of the caption includes obtaining a final feature of the first image and the second image, based on the viewpoint-aligned feature of the first image, the viewpoint-aligned feature of the second image, and the difference feature.

10. The method of claim 9, wherein the generating of the caption includes inputting the obtained final feature to a recurrent neural network (RNN) to convert into text.

11. The method of claim 1, further including:
   obtaining a composite image feature by applying the caption to the viewpoint-aligned feature of the first image.

12. The method of claim 11, further including:
   determining a first loss value based on the generated caption and a target caption, determining a second loss value based on the composite image feature and the viewpoint-aligned feature of the second image, and determining a final loss value based on the first loss value and the second loss value.

13. The method of claim 12, further including:
   adjusting a parameter of the image captioning model in a direction to minimize the final loss value.

14. A non-transitory computer-readable recording medium storing a program for implementing an image captioning method using an image captioning model, the image captioning method comprising:
   extracting a feature of a first image from the first image and extracting a feature of a second image from the second image;
   by encoding viewpoint information based on the feature of the first image and the feature of the second image, obtaining a first image's feature including viewpoint information and a second image's feature including the viewpoint information;
   obtaining a viewpoint-aligned feature of the first image and a viewpoint-aligned feature of the second image, based on the first image's feature including the viewpoint information and the second image's feature including the viewpoint information; and
   generating a caption describing a difference between the first image and the second image, based on the viewpoint-aligned feature of the first image and the viewpoint-aligned feature of the second image.

15. The non-transitory computer-readable recording medium of claim 14,
   wherein the first image's feature including the viewpoint information indicates a first image's feature infused with the viewpoint information of the second image, and
   wherein the second image's feature including the viewpoint information indicates a second image's feature infused with the viewpoint information of the first image.

16. The non-transitory computer-readable recording medium of claim 14, wherein the obtaining of the first image's feature including the viewpoint information and the second image's feature including the viewpoint information includes:

generating a similarity map based on the feature of the first image and the feature of the second image; and encoding the viewpoint information by comparing locations of an object existing in the first image and the second image based on the similarity map.

17. The non-transitory computer-readable recording medium of claim 14, wherein the obtaining of the viewpoint-aligned feature of the first image and the viewpoint-aligned feature of the second image includes:

obtaining fused features by fusing the first image's feature including the viewpoint information and the second image's feature including the viewpoint information.

18. The non-transitory computer-readable recording medium of claim 17, wherein the obtaining of the viewpoint-aligned feature of the first image and the viewpoint-aligned feature of the second image further includes:

obtaining a difference feature indicating the difference between the first image and the second image by determining a difference among the obtained fused features.

19. The non-transitory computer-readable recording medium of claim 18, wherein the obtaining of the viewpoint-aligned feature of the first image and the viewpoint-aligned feature of the second image further includes:

obtaining the viewpoint-aligned feature of the first image and the viewpoint-aligned feature of the second image by applying an attention mechanism to the fused features and the difference feature.

20. The non-transitory computer-readable recording medium of claim 14, wherein the generating of the caption includes obtaining fused features by fusing the viewpoint-aligned feature of the first image and the viewpoint-aligned feature of the second image.

21. The non-transitory computer-readable recording medium of claim 20, wherein the generating of the caption further includes obtaining a difference feature indicating the difference between the first image and the second image by determining a difference among the obtained fused features.

22. The non-transitory computer-readable recording medium of claim 21, wherein the generating of the caption includes obtaining a final feature of the first image and the second image, based on the viewpoint-aligned feature of the first image, the viewpoint-aligned feature of the second image, and the difference feature.

23. The non-transitory computer-readable recording medium of claim 22, wherein the generating of the caption includes inputting the obtained final feature to a recurrent neural network (RNN) to convert into text.

24. An apparatus of training an image captioning model, the apparatus comprising:

a feature extractor configured to extract a feature of a first image from the first image and to extract a feature of a second image from the second image;

a first encoder configured to encode viewpoint information based on the feature of the first image and the feature of the second image to obtain a first image's feature including viewpoint information and a second image's feature including the viewpoint information;

a second encoder configured to obtain a viewpoint-aligned feature of the first image and a viewpoint-aligned feature of the second image, based on the first image's feature including the viewpoint information and the second image's feature including the viewpoint information; and a caption generator configured to generate a caption describing a difference between the first image and the second image, based on the viewpoint-aligned feature of the first image and the viewpoint-aligned feature of the second image.

25. The apparatus of claim 24, wherein the first image's feature including the viewpoint information indicates a first image's feature infused with the viewpoint information of the second image, and wherein the second image's feature including the viewpoint information indicates a second image's feature infused with the viewpoint information of the first image.

26. The apparatus of claim 24, wherein the first encoder is configured to:

generate a similarity map based on the feature of the first image and the feature of the second image, and encode the viewpoint information by comparing locations of an object existing in the first image and the second image based on the similarity map.

27. The apparatus of claim 24, wherein the first encoder is configured to obtain fused features by fusing the first image's feature including the viewpoint information and the second image's feature including the viewpoint information.

28. The apparatus of claim 27, wherein the second encoder is further configured to obtain a difference feature indicating the difference between the first image and the second image by determining a difference among the obtained fused features.

29. The apparatus of claim 28, wherein the second encoder is further configured to obtain the viewpoint-aligned feature of the first image and the viewpoint-aligned feature of the second image by applying an attention mechanism to the fused features and the difference feature.

30. The apparatus of claim 24, wherein the caption generator is configured to obtain fused features by fusing the viewpoint-aligned feature of the first image and the viewpoint-aligned feature of the second image.

31. The apparatus of claim 30, wherein the caption generator is further configured to obtain a difference feature indicating the difference between the first image and the second image by determining a difference among the obtained fused features.

32. The apparatus of claim 31, wherein the caption generator is configured to obtain a final feature of the first image and the second image, based on the viewpoint-aligned feature of the first image, the viewpoint-aligned feature of the second image, and the difference feature.

33. The apparatus of claim 32, wherein the caption generator is configured to input the obtained final feature to a recurrent neural network (RNN) to convert into text.

34. The apparatus of claim 24, further including:

a verification module configured to obtain a composite image feature by applying the caption to the viewpoint-aligned feature of the first image.

35. The apparatus of claim 34, further including:

a training module configured to determine a first loss value based on the generated caption and a target caption, determine a second loss value based on the composite image feature and the viewpoint-aligned feature of the second image, and determine a final loss value based on the first loss value and the second loss value.

36. The apparatus of claim 35, wherein the training module is configured to adjust a parameter of the image captioning model in a direction to minimize the final loss value.

\* \* \* \* \*